(12) United States Patent
Suzuki et al.

(10) Patent No.: US 7,423,354 B2
(45) Date of Patent: Sep. 9, 2008

(54) STORAGE SYSTEM

(75) Inventors: Hiroshi Suzuki, Sagamihara (JP);
Hiromi Matsushige, Hiratsuka (JP);
Masato Ogawa, Chigasaki (JP);
Tomokazu Yokoyama, Fujisawa (JP);
Masateru Kurokawa, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 315 days.

(21) Appl. No.: 10/802,913

(22) Filed: Mar. 18, 2004

(65) Prior Publication Data

US 2005/0141184 A1 Jun. 30, 2005

(30) Foreign Application Priority Data

Dec. 25, 2003 (JP) ............................. 2003-428829

(51) Int. Cl.
*H02J 1/00* (2006.01)
*H02J 3/00* (2006.01)
(52) U.S. Cl. ........................................................ 307/28
(58) Field of Classification Search .................... 307/28
See application file for complete search history.

(56) References Cited

U.S. PATENT DOCUMENTS

| | | | |
|---|---|---|---|
| 3,432,795 A | 3/1969 | Jayne | |
| 5,325,363 A | 6/1994 | Lui | |
| 5,335,327 A | 8/1994 | Hisano et al. | |
| 5,423,046 A | 6/1995 | Nunnelley et al. | |
| 5,432,046 A | 6/1995 | Nunnelley et al. | |
| 5,475,814 A | 12/1995 | Tomimitsu | |
| 5,541,787 A | 7/1996 | Jabbari et al. | |
| 5,546,558 A | 8/1996 | Jacobson et al. | |
| 5,583,876 A | 12/1996 | Kakuta | |
| 5,603,003 A | 2/1997 | Akizawa et al. | |
| 5,636,356 A | 6/1997 | Kakuta et al. | |
| 5,675,816 A | 10/1997 | Hiyoshi et al. | |
| 5,768,117 A | 6/1998 | Takahashi et al. | |
| 5,784,641 A | 7/1998 | Sueyoshi et al. | |
| 5,790,374 A | 8/1998 | Wong | |

(Continued)

FOREIGN PATENT DOCUMENTS

EP 0795824 9/1997

(Continued)

OTHER PUBLICATIONS

Transistor Gijutsu Special No. 28, 2d Ed., CQ Publishing Co., Ltd., Jan. 20, 1993, pp. 4 and 7. (English Translation of Relevant Portions).

(Continued)

*Primary Examiner*—Michael J Sherry
*Assistant Examiner*—Adi Amrany
(74) *Attorney, Agent, or Firm*—Mattingly, Stanger, Malur & Brundidge, P.C.

(57) ABSTRACT

In a RAID system, the power supplied to hard disks (HDDs) can be increased, and a plurality of types of HDDs can be installed. A plurality of HDD packs 33 are supplied with a single high voltage from a motherboard 28. The HDD packs 33 each accommodate, in a canister, an HDD 107, 181, 185 or 187 with different power supply specifications or communication interface specifications, as well as a DC/DC converter 109 to convert the power supply. Part of the HDD packs 33 have a data transfer interface conversion circuit 195 as well.

13 Claims, 12 Drawing Sheets

U.S. PATENT DOCUMENTS

| | | | |
|---|---|---|---|
| 5,805,788 A | 9/1998 | Johnson | |
| 5,812,754 A | 9/1998 | Lui et al. | |
| 5,822,782 A | 10/1998 | Humlicek et al. | |
| 5,832,204 A | 11/1998 | Apperley et al. | |
| 5,838,891 A * | 11/1998 | Mizuno et al. | 714/5 |
| 5,842,030 A | 11/1998 | Larabell et al. | |
| 5,845,319 A | 12/1998 | Yorimitsu | |
| 5,848,282 A | 12/1998 | Kang et al. | |
| 5,867,736 A | 2/1999 | Jantz | |
| 5,884,098 A | 3/1999 | Mason, Jr. | |
| 5,886,424 A | 3/1999 | Kim | |
| 5,915,122 A | 6/1999 | Tsurumi | |
| 5,951,691 A | 9/1999 | Ng et al. | |
| 6,012,124 A | 1/2000 | Kamo et al. | |
| 6,029,199 A | 2/2000 | Allen et al. | |
| 6,037,738 A | 3/2000 | Morita et al. | 318/625 |
| 6,061,750 A | 5/2000 | Beardsley et al. | |
| 6,094,725 A | 7/2000 | Hiyoshi et al. | |
| 6,108,748 A | 8/2000 | Ofek et al. | |
| 6,115,797 A | 9/2000 | Kanda et al. | |
| 6,137,679 A | 10/2000 | Chang | |
| 6,154,850 A | 11/2000 | Idleman et al. | |
| 6,173,360 B1 | 1/2001 | Beardsley et al. | |
| 6,201,692 B1 | 3/2001 | Gamble et al. | |
| 6,204,574 B1 | 3/2001 | Chi | 307/66 |
| 6,219,752 B1 | 4/2001 | Sekido | |
| 6,219,753 B1 | 4/2001 | Richardson | |
| 6,223,249 B1 | 4/2001 | Kato et al. | |
| 6,231,224 B1 | 5/2001 | Gamble et al. | |
| 6,240,486 B1 | 5/2001 | Ofek et al. | |
| 6,272,573 B1 | 8/2001 | Coale et al. | |
| 6,282,602 B1 | 8/2001 | Blumenau et al. | |
| 6,317,839 B1 | 11/2001 | Wells | |
| 6,351,375 B1 | 2/2002 | Hsieh et al. | |
| 6,400,730 B1 | 6/2002 | Latif et al. | |
| 6,449,709 B1 | 9/2002 | Gates | |
| 6,467,047 B1 | 10/2002 | Scaringella et al. | 714/6 |
| 6,484,236 B2 | 11/2002 | Fujimoto et al. | |
| 6,484,269 B1 | 11/2002 | Kopylovitz | |
| 6,502,108 B1 | 12/2002 | Day, III et al. | |
| 6,504,350 B2 | 1/2003 | Leonowich | 323/281 |
| 6,510,050 B1 | 1/2003 | Lee et al. | |
| 6,510,491 B1 | 1/2003 | Franklin et al. | |
| 6,520,809 B1 | 2/2003 | Son | |
| 6,549,978 B2 | 4/2003 | Mansur et al. | |
| 6,553,408 B1 | 4/2003 | Merrell et al. | |
| 6,606,690 B2 | 8/2003 | Padovano | |
| 6,628,513 B1 | 9/2003 | Gallagher et al. | |
| 6,636,933 B1 | 10/2003 | MacLellan et al. | |
| 6,636,934 B1 | 10/2003 | Linnell | |
| 6,640,278 B1 | 10/2003 | Nolan et al. | |
| 6,651,137 B2 | 11/2003 | Baek et al. | |
| 6,658,592 B1 | 12/2003 | Cohen et al. | |
| 6,684,282 B1 | 1/2004 | Kocis | |
| 6,684,295 B2 | 1/2004 | Fujimoto et al. | |
| 6,708,232 B2 | 3/2004 | Obara et al. | |
| 6,728,922 B1 | 4/2004 | Sundaram et al. | |
| 6,742,068 B2 | 5/2004 | Gallagher et al. | |
| 6,745,287 B2 | 6/2004 | Fujimoto et al. | |
| 6,763,409 B1 | 7/2004 | Elliott | |
| 6,763,436 B2 | 7/2004 | Gabber et al. | |
| 6,772,287 B2 | 8/2004 | Uchiyama et al. | |
| 6,772,365 B1 | 8/2004 | Obara | |
| 6,792,486 B1 | 9/2004 | Hanan et al. | |
| 6,795,322 B2 * | 9/2004 | Aihara et al. | 363/37 |
| 6,831,839 B2 | 12/2004 | Bovell | |
| 6,834,326 B1 | 12/2004 | Wang et al. | |
| 6,883,065 B1 | 4/2005 | Pittelkow et al. | |
| 7,047,354 B2 * | 5/2006 | Yagisawa et al. | 711/112 |
| 7,051,216 B2 * | 5/2006 | Suzuki et al. | 713/300 |
| 7,080,201 B2 * | 7/2006 | Suzuki et al. | 711/114 |
| 2001/0014956 A1 | 8/2001 | Nagata et al. | |
| 2001/0019509 A1 | 9/2001 | Aho et al. | |
| 2001/0026462 A1 | 10/2001 | Tokunaga et al. | 363/97 |
| 2001/0046118 A1 | 11/2001 | Yamanashi et al. | |
| 2001/0049799 A1 | 12/2001 | Morita et al. | 714/6 |
| 2001/0054136 A1 | 12/2001 | Ninomiya et al. | |
| 2001/0056527 A1 | 12/2001 | Ninomiya et al. | |
| 2002/0007469 A1 | 1/2002 | Taketa et al. | |
| 2002/0019897 A1 | 2/2002 | Cruyningen | |
| 2002/0032875 A1 | 3/2002 | Kashani | |
| 2002/0040413 A1 | 4/2002 | Okada et al. | |
| 2002/0049886 A1 | 4/2002 | Furuya et al. | |
| 2002/0062387 A1 | 5/2002 | Yatziv | |
| 2002/0062454 A1 | 5/2002 | Fung | |
| 2002/0069317 A1 | 6/2002 | Chow et al. | |
| 2002/0069334 A1 | 6/2002 | Hsia et al. | |
| 2002/0071292 A1 | 6/2002 | Aihara et al. | |
| 2002/0087899 A1 | 7/2002 | Kano et al. | |
| 2002/0138705 A1 | 9/2002 | Suzuki et al. | |
| 2002/0144048 A1 | 10/2002 | Bolt et al. | |
| 2002/0144057 A1 | 10/2002 | Li et al. | |
| 2002/0147945 A1 | 10/2002 | Fox et al. | |
| 2002/0162048 A1 | 10/2002 | Ackaret et al. | |
| 2002/0162057 A1 | 10/2002 | Talagala | |
| 2002/0196601 A1 | 12/2002 | Lee et al. | |
| 2003/0031187 A1 | 2/2003 | Heffernan et al. | |
| 2003/0041201 A1 | 2/2003 | Rauscher | |
| 2003/0041278 A1 | 2/2003 | Lin | |
| 2003/0046460 A1 | 3/2003 | Inoue et al. | |
| 2003/0097487 A1 | 5/2003 | Rietze et al. | |
| 2003/0097504 A1 | 5/2003 | Oeda et al. | |
| 2003/0097607 A1 | 5/2003 | Bessire | |
| 2003/0107906 A1 | 6/2003 | Tokunaga et al. | 363/89 |
| 2003/0110330 A1* | 6/2003 | Fujie et al. | 710/36 |
| 2003/0115437 A1 | 6/2003 | Tomita | |
| 2003/0131291 A1 | 7/2003 | Morrison et al. | |
| 2003/0135577 A1 | 7/2003 | Weber et al. | |
| 2003/0145167 A1 | 7/2003 | Tomita | |
| 2003/0149840 A1 | 8/2003 | Bolt et al. | |
| 2003/0163639 A1 | 8/2003 | Baum | |
| 2003/0167439 A1 | 9/2003 | Talagala et al. | |
| 2003/0172150 A1 | 9/2003 | Kennedy | |
| 2003/0177404 A1 | 9/2003 | Jorgenson et al. | |
| 2003/0182502 A1 | 9/2003 | Kleiman et al. | |
| 2003/0189811 A1 | 10/2003 | Peeke et al. | |
| 2003/0196002 A1 | 10/2003 | Nakayama et al. | |
| 2003/0196147 A1 | 10/2003 | Hirata et al. | |
| 2003/0200472 A1 | 10/2003 | Midorikawa et al. | |
| 2003/0204671 A1 | 10/2003 | Matsunami et al. | |
| 2003/0212859 A1 | 11/2003 | Ellis | |
| 2003/0217300 A1 | 11/2003 | Fukumori et al. | |
| 2003/0221061 A1 | 11/2003 | El-Batal | |
| 2003/0221077 A1 | 11/2003 | Ohno et al. | |
| 2003/0231010 A1* | 12/2003 | Sase et al. | 323/282 |
| 2003/0231420 A1 | 12/2003 | Kano et al. | |
| 2004/0003306 A1* | 1/2004 | Oomori | 713/300 |
| 2004/0010660 A1 | 1/2004 | Konshak et al. | |
| 2004/0010662 A1 | 1/2004 | Aruga | |
| 2004/0024930 A1 | 2/2004 | Nakayama et al. | |
| 2004/0034731 A1 | 2/2004 | Sivertsen | |
| 2004/0068610 A1 | 4/2004 | Umberger et al. | |
| 2004/0068670 A1 | 4/2004 | Suzuki et al. | |
| 2004/0073747 A1 | 4/2004 | Lu | |
| 2004/0078663 A1 | 4/2004 | Inaba | |
| 2004/0078707 A1 | 4/2004 | Apperley et al. | |
| 2004/0088482 A1* | 5/2004 | Tanzer et al. | 711/114 |
| 2004/0088589 A1 | 5/2004 | Westerinen et al. | |
| 2004/0107325 A1 | 6/2004 | Mori | |
| 2004/0111485 A1 | 6/2004 | Mimatsu et al. | |
| 2004/0111560 A1 | 6/2004 | Takase et al. | |
| 2004/0117517 A1 | 6/2004 | Beauchamp et al. | |
| 2004/0117534 A1 | 6/2004 | Parry et al. | |
| 2004/0128627 A1 | 7/2004 | Zayas | |

| | | | |
|---|---|---|---|
| 2004/0139260 | A1 | 7/2004 | Steinmetz |
| 2004/0143688 | A1 | 7/2004 | Sugimoto |
| 2004/0148329 | A1 | 7/2004 | Ogasawara et al. |
| 2004/0148460 | A1 | 7/2004 | Steinmetz |
| 2004/0148461 | A1 | 7/2004 | Steinmetz |
| 2004/0153614 | A1 | 8/2004 | Bitner et al. |
| 2004/0162940 | A1 | 8/2004 | Yagisawa et al. |
| 2004/0169996 | A1 | 9/2004 | Paul et al. |
| 2004/0177218 | A1 | 9/2004 | Meehan et al. |
| 2004/0181699 | A1 | 9/2004 | Katoh et al. |
| 2004/0193760 | A1 | 9/2004 | Matsunami et al. |
| 2004/0193791 | A1 | 9/2004 | Felton et al. |
| 2004/0199353 | A1 | 10/2004 | Bingham et al. |
| 2004/0199515 | A1* | 10/2004 | Penny et al. ............ 707/10 |
| 2004/0221101 | A1 | 11/2004 | Voorhees et al. |
| 2004/0236908 | A1 | 11/2004 | Suzuki et al. |
| 2004/0243386 | A1 | 12/2004 | Stolowitz et al. |
| 2004/0255174 | A1 | 12/2004 | Chen et al. |
| 2004/0267516 | A1 | 12/2004 | Jibbe et al. |
| 2004/0268037 | A1 | 12/2004 | Buchanan, Jr. et al. |
| 2004/0268069 | A1 | 12/2004 | Satoyama et al. |
| 2005/0021906 | A1 | 1/2005 | Nakamura et al. |
| 2005/0027900 | A1 | 2/2005 | Pettey |
| 2005/0081068 | A1 | 4/2005 | Sakakibara et al. |
| 2005/0097132 | A1 | 5/2005 | Cochran et al. |
| 2005/0117468 | A1 | 6/2005 | Kano et al. |
| 2005/0120263 | A1 | 6/2005 | Kano et al. |
| 2005/0120264 | A1* | 6/2005 | Kano et al. ............ 714/6 |
| 2005/0138154 | A1 | 6/2005 | Seto |
| 2005/0154942 | A1 | 7/2005 | Kano et al. |
| 2005/0216624 | A1 | 9/2005 | Deng et al. ............ 710/74 |

FOREIGN PATENT DOCUMENTS

| | | |
|---|---|---|
| EP | 0844561 | 5/1998 |
| EP | 1001345 | 5/2000 |
| EP | 1315074 | 5/2003 |
| JP | 2188835 | 7/1990 |
| JP | 04-078062 | 3/1992 |
| JP | 5150909 | 6/1993 |
| JP | 08-083149 | 3/1996 |
| JP | 9330182 | 12/1997 |
| JP | 09330184 | 12/1997 |
| JP | 10301720 | 11/1998 |
| JP | 2000-122815 | 4/2000 |
| JP | 2001142650 | 5/2001 |
| JP | 2001167040 | 6/2001 |
| JP | 2001337868 | 12/2001 |
| JP | 2002150746 | 5/2002 |
| JP | 2002 333954 | 11/2002 |
| JP | 200336146 | 2/2003 |
| JP | 2004 178557 | 6/2004 |
| WO | WO 93/23805 | 11/1993 |
| WO | 9950754 | 10/1999 |

OTHER PUBLICATIONS

IBM Technical Disclosure Bulletin vol. 38, No. 7, Jul. 1995 (New York), "Foreground/Background Checking of Parity in a Redundant Array of Independent Disks-5 Storage Subsystem", pp. 455-458.

EMC 2-Gigabit Disk-Array Enclosure EMC Corporation (DAE2), FC and ATA Models, Hardware Reference P/N 014003048, Rev A02.

ESG Product Brief EMC, Mar. 2003, CLARiiON with ATA, pp. 1-2.

EMC CLARiiON Backup Storage Solutions Back-up-to-Disk Guide with Legato Networker DiskBackup Option (DBO), Engineering White Paper, Apr. 8, 2003, pp. 1-28.

EMC CLARiiON Backup Storage Solutions Backup-to-disk Guide with Computer Associates, BrightStor ARCserve Backup, Engineering White Paper, Apr. 16, 2003, pp. 1-24.

EMC CLARiiON Backup Storage Solutions Backup-to-Disk Guide with CommVault Galaxy, Engineering White Paper, Mar. 3, 2003, pp. 1-26.

EMC CLARiiON Backup Storage Solutions Backup-to-Disk Guide: An Overview, Engineering White Paper, Mar. 3, 2003, pp. 1-10.

EMC CLARiiON Backup Storage Solutions Backup-to-Disk Guide with Computer Associates BrightStor Enterprise Backup, Engineering White Paper, Apr. 16, 2003, pp. 1-23.

Judd, Ian, "Device Services Interface", Online, Jun. 19, 1996, pp. 1-8.

Synetic Inc., SyneRAID -800SA, SCSI/Fibre-toSATA RAID Subsystem product information, available at:http://www.synetic.net/Synetic-Products/SyneRAID-Units/SyneRAID-800SATA/SyneRAID-800SA.html.

"SATA Disk System and Expansion of Unit offer 3.5 TB storage", Product News Network, Nov. 1, 2004.

SGI InfiniteStorage TP9300S Storage Array, Data Sheet, available at: http://www.sgi.com/pdfs/3643.pdf.

Adaptec FS4500 Fibre to SATA RAID, Data Sheet, available at: http:/www.sunstarco.com/PDF%20Files/Adaptec%20FS4500%20SATA.pdf.

Infortrend EonStor A16F-R1211/S1211 FC-to-SATA RAID Subsystem productinformation, available at: http://www.infortrend.com/2_product/a16f-r(s) 1211.asp.

Serial Attached SCSI and Serial ATA Compatibility, White Paper, Intel, Jan. 2003, pp. 1-8.

R. E. Dessey, "Delivering the World's Knowledge", Laboratory Automation and Information Management 32, 1996, (Elsevier Science B.V.), Computer Connections, pp. 53-62.

EMC 2-Gigabit Disk-Array Enclosure EMC Corporation (DAE2), FC and ATA Models, Hardware Reference P/N 014003048, Rev A02.

"Veritas Volume Manager Storage Administrator 3.2, Administrator's Guide", Veritas Software Corporation, Online, Jul. 2001, pp. 1-184.

Judd, Ian, "Device Services Interface", Online, Jun. 19, 1996, pp. 1-8.

"Veritas Volume Manager Storage Administrator 3.2, Administrator's Guide".

Veritas Software Corporation, Online, Jul., 2001, pp. 1-184.

Synetic Inc., SyneRAID -800SA, SCSI/Fibre-toSATA RAID Subsystem product information,available at :http://www.synetic.net/Synetic-Products/SyneRAID-Units/SyneRAID-80SATA/SyneRAID-800SA.html.

"SATA Disk System and Expansion of Unit offer 3.5 TB storage", Product News Network, Nov. 1, 2004.

* cited by examiner

STORAGE SYSTEM

CROSS-REFERENCE TO RELATED APPLICATIONS

This application relates to and claims priority from Japanese Patent Application No. 2003-428829 filed on Dec. 25, 2003, the entire disclosure of which is incorporated herein by reference.

BACKGROUND OF THE INVENTION

1. Field of the Invention

This invention relates to a storage system having a plurality of physical storage devices (for example, hard disk drives), and in particular to technology to provide a power supply to a plurality of storage devices.

2. Description of the Related Art

Storage systems of which RAID systems are representative comprise numerous storage devices, such as for example hard disk drives (hereafter abbreviated "HDD"). In Japanese Patent Laid-open 4-78062, a RAID system configured to supply power to a plurality of HDDs from the same power supply circuit is described.

In general, each of the HDDs installed in such a storage system is assembled as a single unit (hereafter called a "HDD unit") in which the group of components necessary to function as an HDD (for example, the magnetic disks, read/write heads, power transmission mechanisms and other mechanical components, the motors and other electromechanical components needed to drive the former, and the driver circuits for the electromechanical components, logic circuits for data processing, microprocessors, and other electrical circuit components) are indivisibly integrated and fixed in a single casing. An HDD unit has connectors for connection to data communication circuits within the storage system and to power supply circuits. The physical specifications of the connectors are characteristic of the specifications of the interface for data transfer adopted by the HDD; typically, an HDD unit has a prescribed plurality of data transfer terminals and a prescribed plurality of power supply terminals. There are various electrical circuit components within an HDD unit, and different types of circuit components require power supplies at different voltage levels. For example, logic circuits for data communication and control require a 5 V_DC power supply, whereas motors, heads, and other actuators require a 12 V_DC power supply. A plurality of power supply terminals among the connectors are allocated to such power supplies with different voltage levels.

Efforts are made each year to expand the capacity of this type of storage system, and the number of HDD units installed increases steadily. In addition, higher reliability, more compact size, and lower prices are also sought. Further, as magnetic disks move toward higher densities, faster data transfer rates and higher revolution rates, there is a trend toward increased power consumption within HDD units. On the other hand, there is also a trend towards diversification of the specifications of power supplied to HDD units within a storage system. Also, there is a trend toward adoption of interface specifications for data transfer to HDD units enabling faster operation and lower prices, such as for example the Small Computer System interface (hereafter abbreviated to "SCSI"), Fiber Channel Interface (hereafter "FC"), and Serial ATA (hereafter "SATA").

Given the above circumstances, there are the following problems and demands.

(1) The number of power supply terminals of the connector of an HDD unit is fixed at a certain number by the specifications of the interface for data transfer, and there is a constant upper limit to the current which can flow to each power supply terminal. For example, FC specifications stipulate that a connector has four power supply terminals, and that the upper limit to current which can flow through one power supply terminal is 1 A. Normally, two power supply terminals are allocated for 12 V_DC, and two power supply terminals for 5 V_DC. Hence only current up to 2 A can be supplied to an HDD unit by either a 12 V_DC or a 5 V_DC power supply. However, as explained above, there is a tendency toward increases in the power consumption of HDD units, and so there is the possibility that it will no longer be possible to supply adequate power to HDD units using existing power supply terminals.

(2) The trends in recent years toward increases in the number of installed HDD units and toward increasing HDD internal power consumption have given rise to the need for larger-capacity power supply circuits for storage systems.

(3) In addition to existing HDD units requiring supply of a plurality of voltage levels such as 5 V_DC and 12 V_DC, HDD units which require the supply of other voltage levels are appearing. Consequently it is desirable that a single storage system be able to accept installation of a plurality of types of HDD units with different power supply specifications.

(4) There exist a plurality of various specifications for the interface for HDD unit data transfer, such as for example FC and SATA. Hence it is desirable that a single system be able to accept installation of a plurality of types of HDD units with different interface specifications.

SUMMARY OF THE INVENTION

Hence an object of this invention is to increase the power that can be supplied to the HDD units installed in a storage system.

A further object of this invention is to enable installation of a plurality of types of HDD units with different power supply specifications in the same storage system.

Still a further object of this invention is to enable installation of a plurality of types of HDD units with different interface specifications in the same storage system.

In order to achieve the above objects, a storage system connectable to a host computer according to one aspect of the invention disclosed in this application comprises a plurality of storage devices which store data from the host, a plurality of housings in which the plurality of storage devices are respectively mounted, and a plurality of first power supplies which supply a voltage to the plurality of storage devices. At least one among the above plurality of housings has a voltage converter; this voltage converter receives power having a first voltage value from the above first power supply, converts this first voltage value into a different second voltage value, and supplies power having a single voltage value to the storage device.

A storage system according to another aspect of the invention disclosed in this application comprises a plurality of physical storage devices (for example, hard disk drives), and a power supply circuit which outputs power at a prescribed voltage level. Power conversion circuits are provided for each of the physical storage devices, and each power conversion circuit converts power at the prescribed voltage level from the power supply circuit into power at the voltage levels required by the corresponding physical storage devices, and provides the power to the physical storage devices. By selecting the output voltage level of the power conversion circuit for each physical storage device, a plurality of types of physical storage devices having different voltage specifications can be installed in the same storage system. It is desirable that the voltage level output by the power supply circuit be a single level equal to or greater than the highest level among the power supply voltage levels required by the plurality of physical storage devices. When the internal circuit components of a certain physical storage device require a plurality of types of power at different voltage levels, the power conversion circuit for that physical storage device may output all the plurality of types of power at the different voltage levels, or may output a single type of power at the highest voltage level (or at a voltage level higher than the highest voltage level) among the plurality of types of power. In the latter case, it is necessary to perform power conversion within the physical storage device of the voltage level from the power conversion circuit to the lower voltage levels required by the internal circuit components. However, because the voltage applied to the physical storage device is higher, the current flowing to the power supply terminals in the connector of the physical storage device is smaller, and so the power which can be supplied within the range of allowable currents of the power supply terminals is increased. Further, when one type of power is supplied to a physical storage device from a power conversion circuit, if the connector of the physical storage device has a plurality of power supply terminals, all of the plurality of power supply terminals can be used for the supply of the one type of power. As a result, higher power can easily be supplied within the range of allowable currents of the power supply terminals.

In a method of power supply to a plurality of physical storage devices according to a further other aspect of the invention, power is generated with a prescribed voltage level, and power at this prescribed voltage level is converted into power at the voltage levels required by the respective physical storage devices and is supplied to the respective physical storage devices.

A storage system according to a further other aspect of the invention comprises a power supply circuit which outputs a single type of power having a single voltage level; a main body having a main power supply line to send the one type of power output from the power supply circuit, a data transfer path for data transfer, and a plurality of pack connection sites; and a plurality of storage device packs which can receive the above one type of power from the main power supply line, can exchange data with the data transfer path, are respective connected to the plurality of pack connection sites of the main body, and can be removed from the pack connection sites. Each storage device pack has a physical storage device requiring supply of power of one or more types with prescribed voltage levels and a power conversion circuit which receives the one type of power from the above main power supply line, converts this one type of power into the one or more types of power required by the physical storage device, and outputs the converted one or more types of power to the physical storage device. Further, the voltage level of the one type of power from the main power supply line is set to a value equal to or higher than the highest voltage level of the one or more types of power required by the physical storage devices.

In one embodiment, a plurality of storage device packs connected to a motherboard comprise different types of storage device packs, comprising first and second types. A storage device pack of the first type has a multiple-power-supply type physical storage device requiring the supply of a plurality of types of power, each with a prescribed voltage level, and a power conversion circuit which converts a single type of power from the main power supply line into a plurality of types of power required by the multiple-power-supply type physical storage device and inputs these into the multiple-power-supply type physical storage device. A storage device pack of the second type has a single-power-supply type physical storage device requiring the supply of a single type of power with a prescribed voltage level, and a power conversion circuit which converts a single type of power from the main power supply line into the single type of power required by the single-power-supply type physical storage device and inputs this to the single-power-supply type physical storage device. Each type of storage device pack is such that connection is possible to any of a plurality of pack connection sites on the motherboard.

In one embodiment, in the above second type of storage device pack, the single-power-supply type physical storage device has a plurality of power supply input terminals, and the single type of power output from the power conversion circuit is input to the physical storage device via the above plurality of power supply input terminals.

In one embodiment, the plurality of storage device packs connected to the motherboard comprise different types of storage device packs, comprising first and second types. A storage device pack of the first type has a first type physical storage device which requires the supply of a first power type having a first voltage level, and a power conversion circuit which converts the single type of power from the main power supply line into the first power type required by the first type physical storage device and inputs this to the first type physical storage device. A storage device pack of the second type has a second type physical storage device which requires the supply of a second power type having a second voltage level different from the first voltage level, and a power conversion circuit which converts the single type of power from the main power supply line into the second power type required by the second type physical storage device, and inputs this to the second type physical storage device. Each of the types of storage device pack can be connected to any of the plurality of pack connection sites on the motherboard.

In one embodiment, each of the plurality of pack connection sites on the motherboard has a U-turn power supply line which receives one or more types of power output from the power conversion circuit within a storage device pack, and again inputs this power to the storage device pack. At least one among the above plurality of storage device packs is a power-returning type storage device pack. This power-returning type storage device pack further has a return power supply line to return one or more types of power output from the power conversion circuit to the above U-turn power supply line, and an input power supply line for input to the physical storage device of the above one or more types of power re-input from the U-turn power supply line. Also, a power-returning type storage device pack can be connected to any of the plurality of pack connection sites on the motherboard.

In one embodiment, the above power-returning type storage device pack has a canister which accommodates the physical storage device and the power conversion circuit. A main connector and auxiliary connector are provided on the outer face of this canister. The main connector has a power supply terminal which functions as the above input power supply line, and a data transfer terminal for connection of a data transfer path to the physical storage device. The auxiliary connector has a main power supply terminal for connection of the main power supply line to the power conversion circuit, and a return power supply terminal for connection of the above return power supply line to the U-turn power supply line. And, in the canister, the physical storage device is positioned in proximity to the main connector and is directly connected to the main connector.

In one embodiment, the data transfer path of the motherboard forms a prescribed first data transfer interface. The plurality of storage device packs connected to the motherboard comprise different types of storage device packs, comprising first and second types. A first type of storage device pack has a first type of physical storage device having the above first data transfer interface, and a power conversion circuit which converts the single type of power from the main power supply line into the power required by the first type of physical storage device, and inputs this to the first type of physical storage device. On the other hand, a second type of storage device pack has a second type of physical storage device, having a second data transfer interface differing from the above first data transfer interface; a data transfer interface conversion circuit, which converts the above first data transfer interface of the motherboard data transfer path into the second data transfer interface of the second type of physical storage device and supplies this to the second type of physical storage device; and, a power conversion circuit, which converts the single type of power from the main power supply line into the power required by the second type of physical storage device and by the data transfer interface conversion circuit, and inputs these to the second type of physical storage device and to the data transfer interface conversion circuit respectively. Also, each of the types of storage device pack can be connected to any of the plurality of pack connection sites on the motherboard.

In one embodiment, a power supply control circuit which individually turns on and off each of the power conversion circuits within the plurality of storage device packs is further provided.

In one embodiment, a power supply control circuit which individually controls the output voltage levels of the power conversion circuits within the plurality of storage device packs according to the power supply voltage levels required by the respective physical storage devices within the plurality of storage device packs is further provided.

By means of one embodiment of this invention, the power which can be supplied to the HDD units installed in a storage system can be increased.

By means of one embodiment of this invention, a plurality of types of HDD units with different power supply specifications can be installed in the same storage system.

By means of embodiment of this invention, a plurality of types of HDD units with different interface specifications can be installed in the same storage system.

DESCRIPTION OF THE PREFERRED EMBODIMENTS

Figure 1:
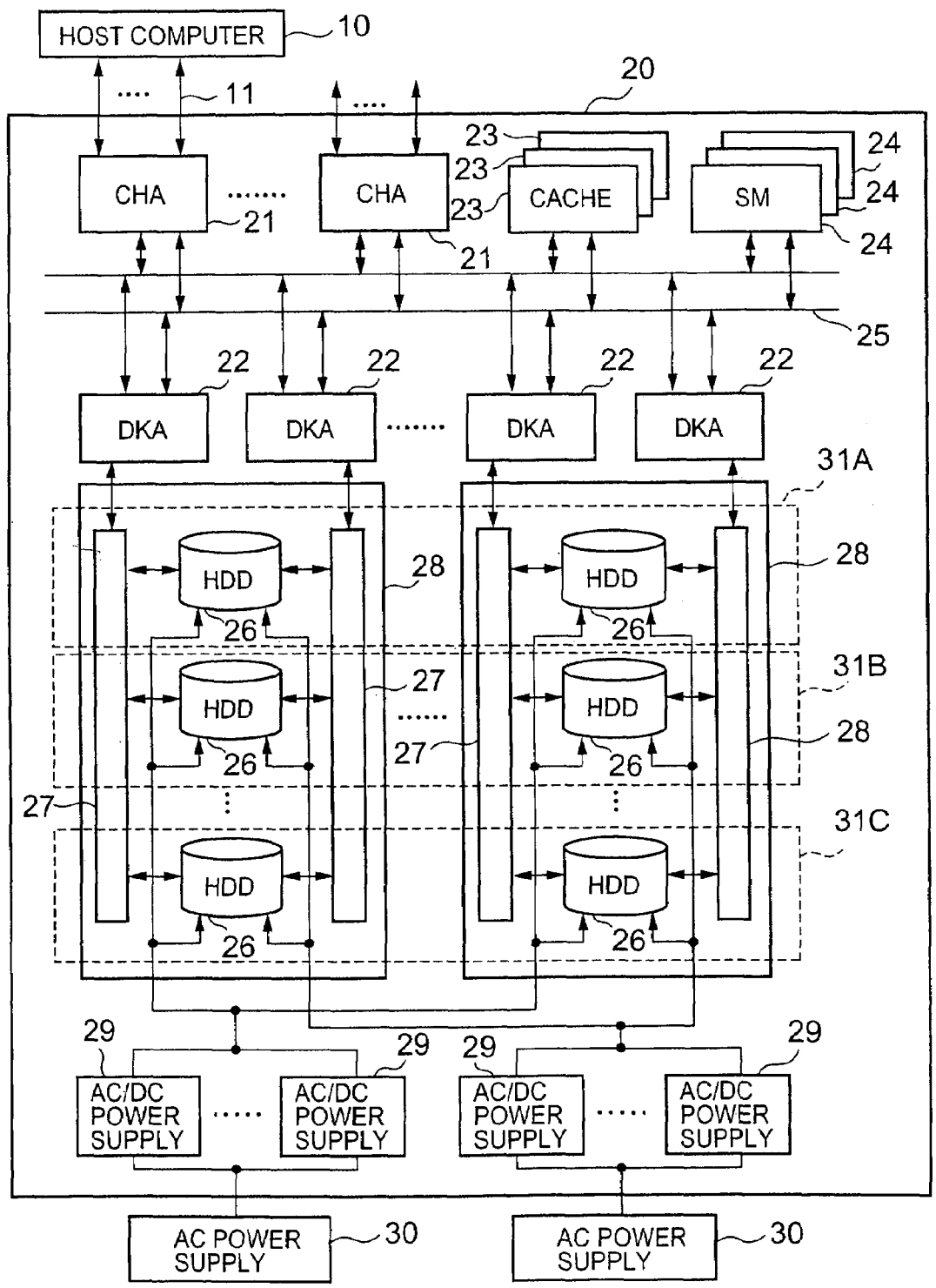
FIG. 1 is a block diagram showing in summary the overall configuration of an aspect of a storage system according to this invention.

FIG. 1 shows in summary the overall configuration of one aspect of a storage system according to this invention.

The storage system 20 shown in FIG. 1 comprises one or more channel adapters (CHA) 21, one or more disk adapters (DKA) 22, one or more cache memories (CACHE) 23, one or more shared memories (SM) 24, one or more common paths 25, a plurality of physical storage devices (that is, storage apparatus) 26, one or more connection control circuits 27, one or more motherboards 28, and one or more main power supply devices 29. As the physical storage devices 26, hard disk drives, nonvolatile semiconductor memory, or other types of devices can be employed, but typically hard disk drives (hereafter abbreviated "HDDs") are used. In the following explanation also, it is assumed that HDDs are employed.

The channel adapter 21, disk adapter 22, cache memory 23 and shared memory 24 are interconnected by the common path 25. The common path 25 may be made twofold redundant (or multiple redundant) in anticipation of faults in the common path 25. The channel adapter 21 is connected by the connection line 11 to one or more host computers 10 or to another storage system (not shown). The channel adapter 21 controls data transfer between the host computer 10 or other storage system and the cache memory 23. The disk adapter 22 controls data transfer between the cache memory 23 and HDDs 26. The cache memory 23 is memory used to temporarily hold data received from a host computer 10 or other storage system or data read from HDDs 26. The shared memory 24 is memory shared by all the channel adapters 21 and all the disk adapters 22 in the storage system 20. The shared memory 24 holds various information used by the channel adapter 21 and disk adapter 22 for control and management.

A motherboard 28 is an electrical circuit board comprising a wiring network for data transfer for the HDDs 26 and a wiring network for power supply. On each motherboard 28 is mounted two (or more) connection control circuits 27 which can be mutually substituted for a plurality of HDDs 26. Each of the two connection control circuits 27 on each motherboard 28 connects, on that motherboard 28, a plurality of HDDs 26 with two disk adapters 22 for which substitution is possible, to enable communication; as these connection control circuits 27, for example, a fiber channel switch or a port bypass circuit or similar may be employed. Each of the connection control circuits 27 and a plurality of HDDs 26 are electrically connected via a wiring network on each of the motherboards 28. Also, each of the connection control circuits 27 and each of the disk adapters 22 are electrically connected via, for example, a multiwire cable. Data transfer is performed between a plurality of HDDs 26 and each of the disk adapters 22 via each of the connection control circuits 27. By means of a (twofold) redundant configuration of the set of connection control circuit 27 and disk adapter 22 on each motherboard 28, safety can be improved in anticipation of malfunctions. As is explained in detail below, each HDD 26 is accommodated in a canister (that is, housing) which can be attached to and removed from a motherboard 28; the pack of an HDD 26 accommodated in such a canister or housing may be called an "HDD pack" or an "HDD housing". In the following explanation, the term "HDD pack" is employed.

The reference numbers 31A, 31B, 31C each indicate groups of HDDs 26 conforming to the RAID principle which are called parity groups (or error collection groups), conforming to the RAID principle. Two or more HDDs 26 belonging to the same parity group 31A, 31B or 31C are installed on different motherboards, and even if one of the HDDs 26 malfunctions, the data of the remaining HDD 26 stores redundant data enabling restoration of the data of the malfunctioning HDD 26. It is desirable that two or more HDDs 26 belonging to the same parity group 31A, 31B or 31C have exactly the same storage capacity, and from this standpoint, normally the same model of HDD from the same manufacturer are combined; hence the electric power specifications and data transfer interface are also the same.

The power supply system of this storage system 20 has one or more AC/DC power supply circuits 29; each AC/DC power supply circuit 29 receives AC power from an external AC power supply (for example, a commercial 200 V_AC power supply) 30, converts this into DC power at a prescribed voltage (for example, 56 V, 48 V, 24 V, or 12 V), and supplies this to the plurality of HDD packs 33 and other circuits on the motherboard 28. Each AC/DC power supply circuit 29 is connected to a plurality of HDD packs 33 on each motherboard 28 via a wiring network for power supply on each motherboard 28. In anticipation of power outages, twofold redundant (or multiple redundant) AC power supplies 30, mutual substitution of which is possible, are used. Each AC power supply 30 is connected to twofold redundant or multiple-redundant AC/DC power supply circuits 29, mutual substitution of which is possible. In the example shown, each AC/DC power supply circuit 29 is shared among a plurality of motherboards 28, but as a modified form, each motherboard 28 may comprise one or more dedicated AC/DC power supply circuits.

Figure 2:
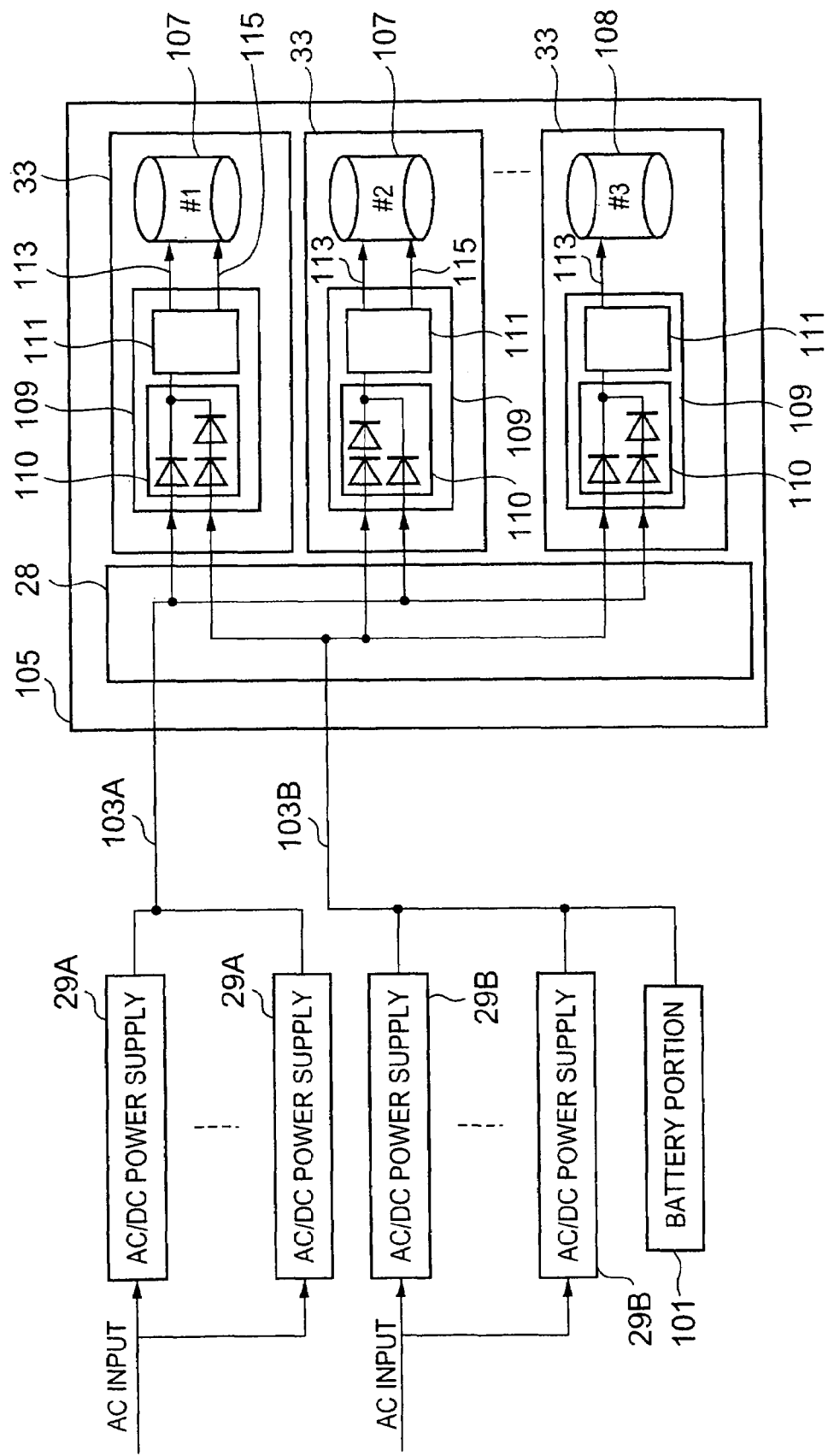
FIG. 2 is a block diagram showing an example of the specific internal configuration of an HDD pack 33, and a specific example of a method of supply of power from an AC/DC power supply circuit 29 to an HDD pack 33.
Figure 3:
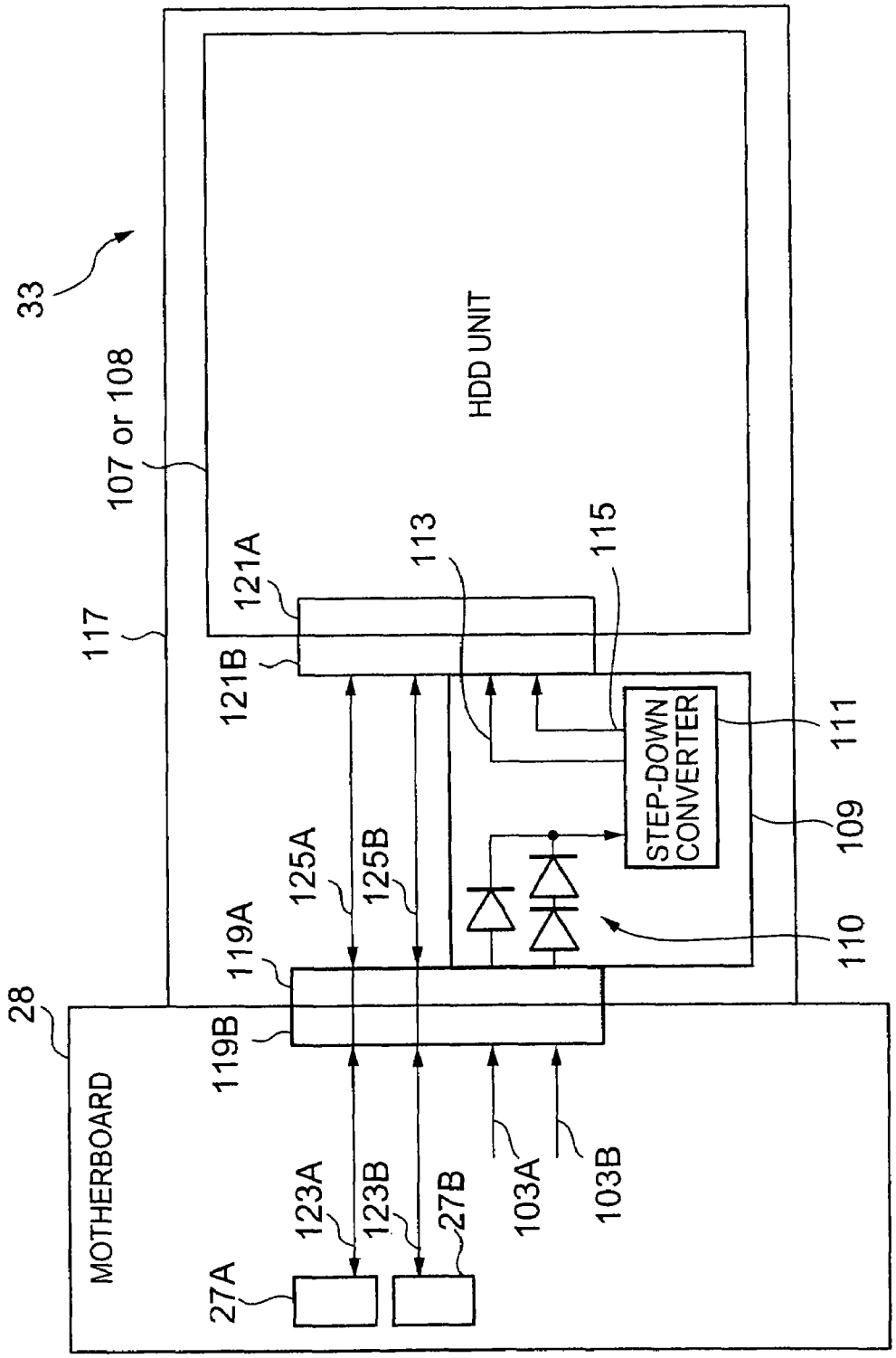
FIG. 3 shows in summary an example of the arrangement of internal components in the HDD pack 33 shown in FIG. 2.

FIG. 2 shows an example of the specific internal configuration of an HDD pack 33, and an example of the power supply wiring from an AC/DC power supply circuit 29 to an HDD pack 33. In FIG. 2, the data transfer wiring is omitted. FIG. 3 shows in summary the arrangement of internal components of the HDD pack 33 shown in FIG. 2. In FIG. 3, the wiring for data transfer is shown in an extremely simplified manner.

As shown in FIG. 2, a plurality of HDD packs 33 are connected to one motherboard 28. The motherboard 28 has a plurality of HDD pack connection sites for connection to HDD packs 33, and a plurality of HDD packs 33 are connected to these HDD pack connection sites. The motherboard 28 and plurality of HDD packs 33 are accommodated within the casing 105 of the storage system main body. Each HDD pack 33 is connected to the redundantly configured power supply lines 103A and 103B via the motherboard 28. The power supply line 103A is supplied with DC power at the same voltage level (that is, voltage value) as an AC/DC power supply circuit 29A to enable mutual substitution. The other power supply line 103B is also supplied with DC power at the same voltage level from the AC/DC power supply circuit 29B, configured with twofold or higher redundancy. At least one among the redundantly configured power supply lines, for example power supply line 103B, is also connected to a battery portion 101 as a backup power supply in anticipation of AC power supply outages. The DC voltage level supplied to each HDD pack 33 by the redundantly configured power supply lines 103A and 103B is a single voltage level. This single power supply voltage level is selected so as not to be lower than any of the plurality of power supply voltage levels (for example, 12 V and 5 V) required by any of the HDD units 107, 108 within any of the HDD packs 33, and preferably to be a much higher level (for example, 56 V_DC or 48 V_DC) which does not exceed a prescribed safety standard (for example, an upper limit of 60 V).

Each HDD pack 33 has one HDD unit 107 or 108 and one DC/DC converter 109, which are interconnected. The HDD unit 107 is a multiple-power-supply type, requiring the supply of all of the plurality of types of DC power (power supply lines 113, 115) with different voltage levels (for example, 12 V and 5 V). On the other hand, the HDD unit 108 is the single-power-supply type, which operates under the supply of power at only a single voltage level (for example, 12 V) (power supply line 113). A single-power-supply type HDD unit 108 can incorporate a power conversion circuit which converts the power supply voltage at a single voltage supplied by the motherboard 28 into the plurality of power supply voltages required by internal circuit components (for example, the comparatively high voltage used to drive magnetic disks, the comparatively low voltage used by logic circuits performing control and data processing, and similar), and supplies these to the respective internal circuit components. As explained above in relation to the prior art, in each HDD unit 107 or 108 the group of components necessary to function as an HDD (for example, the magnetic disks, read/write heads, power transmission mechanisms and other mechanical components, the motors and other electromechanical components needed to drive the former, and the driver circuits for the electromechanical components, logic circuits for data processing, microprocessors, and other electrical circuit components) are indivisibly integrated and fixed in a single casing. Each HDD unit 107 or 108 can function independently as an HDD, and hence in a conventional storage system, the HDD unit 107 or 108 is itself directly connected to the motherboard. However, in the example shown in FIG. 2, the HDD unit 107, 108 is not itself directly connected, but a HDD pack 33 which is a combination of an HDD unit 107 or 108 and a DC/DC converter 109 is direction connected to the motherboard 28.

As shown in FIG. 3, one HDD unit 107 or 108 and a DC/DC converter 109 are accommodated in one canister 117, the entirety of which forms a single HDD pack 33. On the outer face of the canister 117 of the HDD pack 33 is provided a connector 119A having a prescribed number of power supply terminals and data transfer terminals. This connector 119A is connected to the connector 119B with the same specifications provided on the motherboard 28; by this means, the twofold-redundant power supply lines 103A, 103B on the motherboard 28 are connected to the input terminals of the DC/DC converter 109 within the HDD pack 33, and moreover the twofold-redundant data transfer paths 123A, 123B on the motherboard 28 are connected to the terminals on one side of the twofold-redundant data transfer paths 125A, 125B within the HDD pack 33. The HDD unit 107 or 108 in the HDD pack 33 has, on the casing outer surface, a connector 121A having the number of power supply terminals and data transfer terminals conforming to the data transfer interface specifications (for example, FC) adopted by the HDD. This connector 121A is connected to a connector 121B with the same specifications within the HDD pack 33, and by this means the output power supply lines 113, 115 of the DC/DC converter 109 are connected to the power supply input terminals of the HDD unit 107 or 108, and moreover the other-end terminals of the twofold-redundant data transfer paths 125A, 125B are connected to the data transfer terminals of the HDD unit 107 or 108.

The DC/DC converter 109 within the HDD pack 33 converts the DC power at the single voltage level (for example, 48 V) supplied by the twofold-redundant power supply lines 103A, 103B into the plurality of types of DC power with the plurality of voltage levels (for example, 12 V and 5 V) required by all the HDD units 107 and 108, and supplies these to the HDD unit 107 via the power supply lines 113, 115. As shown in FIG. 2 and FIG. 3, the DC/DC converter 109 has an input selector 110 and a step-down converter 111. The input selector 110 uses the difference in the voltage step-down of one diode and two diodes in series to select one among the twofold-redundant power supply lines 103A, 103B and connect this to the step-down converter 111. For example, when both the twofold-redundant power supply lines 103A, 103B are operating effectively, the uppermost input selector 110 in FIG. 2 connects the first power supply line 103A, for which the diode voltage step-down is smaller, to the step-down converter 111, and the second input selector 110 from the top connects the second power supply line 103B to the step-down converter 111. In this way, when both the twofold-redundant power supply lines 103A, 103B are operating effectively, substantially half of the plurality of HDD packs 33 select the first power supply line 103A, and substantially the other half select the second power supply line 103B. By this means, the loads on the twofold-redundant power supply lines 103A and 103B are balanced. When one of the twofold-redundant power supply lines 103A and 103B undergoes a power outage, all the input selectors 110 select the normally operating power supply line.

As shown in FIG. 2 and FIG. 3, the step-down converters 111 within the DC/DC converters 109 convert one type of DC power at a single voltage level (for example, 48 V) from the power supply line 103A or 103B selected by the input selector 110 into the plurality of types of DC power at different voltage levels (for example, 12 V and 5 V) required by all the HDD units 107 and 108, and output these to the power supply lines 113, 115. As a step-down converter 111, for example, a power conversion circuit of the type which performs voltage step-down through on/off switching of the load circuit, such as for example a direct-current chopper circuit, can be used.

As explained above, the two HDD units 107 shown in the top of FIG. 2 are of the multiple-power-supply type, requiring supply of all the plurality of types of DC power with different voltage levels (for example, 12 V and 5 V) output from the DC/DC converter 109. On the other hand, the HDD unit 108 shown in the bottom of the figure is of the single-power-supply type, which operates when supplied with only one type among a plurality of types of DC power (for example, 12 V_DC power). The single-power-supply type HDD unit 108 is connected to only the one power voltage level required by the HDD unit 108 among the output terminals of the DC/DC converter 109, for example, the 12 V_DC power supply line 113. In this way, if the HDD units 107 and 108 are of a type which can operate on any of the plurality of types of DC power 113, 115 output by the DC/DC converter 109, then the HDD units 107 and 108 can be installed on the HDD pack 33 which are installed/connected to the same motherboard 28.

Here, it is assumed that 12 V_DC and 5 V_DC are supplied to the multiple-power-supply type HDD units 107, and that 12 V_DC is supplied to the single-power-supply type HDD unit 108. It is further assumed that the internal power consumption of both types of HDD units 107 and 108 is the same. And, it is assumed that a single-power-supply type HDD unit 108 incorporates a power conversion circuit to convert the 12 V_DC supplied from outside into the 5 V_DC required by the internal logic circuit components, and that the efficiency of this power conversion circuit is 80%. In this case, compared with a multiple-power-supply type HDD unit 107, the power supply current for logic circuit components flowing in the power supply terminals of the connector 121A of a single-power-supply type HDD unit 108 is reduced by half due to the conversion of 12 V_DC to 5 V_DC. Consequently even if the power consumption of internal circuit components increases somewhat, it is easy to stay within the allowable current for the power supply terminals of the connector 121A.

In the configuration example shown in FIG. 2 and FIG. 3, compared with a conventional configuration in which the HDD units 107 or 108 are directly connected to the motherboard, the power supply current supplied from the motherboard 28 to the HDD units 107 is reduced. Hence impedance of the power transmission path from the motherboard 28 to the DC/DC converter 109 and to the DC/DC converters existing in HDD units 108 and similar, and the power supply noise arising from HDD ripple currents generated due to the conversion, are reduced.

Figure 4:
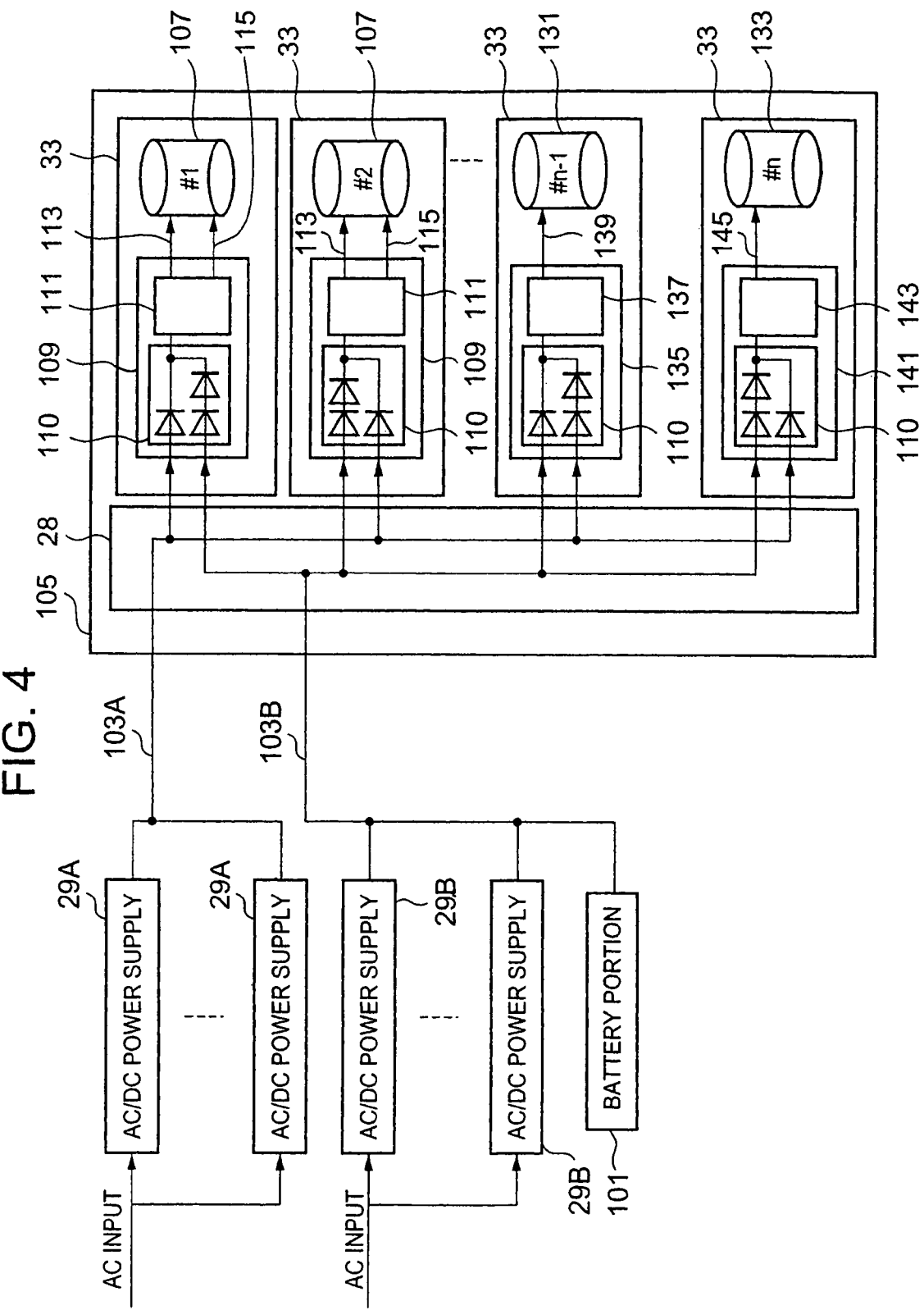
FIG. 4 is a block diagram showing another example of the specific internal configuration of an HDD pack 33.

FIG. 4 shows an example of another specific internal configuration of an HDD pack 33. In FIG. 4, the data transfer wiring is omitted.

In the configuration example of FIG. 4, the three or more types of HDD units 107, 131 and 133 are installed in HDD packs 33 which are connected/installed on the same motherboards 28. One type of HDD unit 107 is a multiple-power-supply type, requiring DC power (power supply lines 113 and 115) at for example two voltage levels (for example, 12 V_DC and 5 V_DC). Another type of HDD unit 131 is a single-power-supply type, operating on DC power (power supply line 139) at a voltage level different from those above (for example, 24 V). Still another type of HDD unit 133 is a single-power-supply type, requiring DC power (power supply line 145) at still another voltage level (for example, 48 V). The power supply voltage levels required by the single-power-supply types of HDD unit 131 and 133 are equal to or, preferably, higher than (for example, 24 V_DC, 48 V_DC, or similar) the highest value (for example 12 V_DC) of the plurality of power supply voltage levels required by the internal circuit components of the HDD units 131 and 133 (for example, 12 V_DC and 5 V_DC). In HDD packs 33 accommodating such different types of HDD units 107, 131 and 133, different types of DC/DC converters 109, 135 and 141 are installed which respectively generate the different voltage levels (for example, 12 V, 5 V, 24 V, 48 V) required by the HDD units 107, 131, 133 from the DC power at the single high voltage level from the motherboard 28 (for example, 48 V). The differences in these types of DC/DC converters 109, 135 and 141 are mainly the differences in output voltages of the step-down converters 111, 137, 143 installed therein. That is, the step-down converter 111 converts the DC power at the single high voltage level from the motherboard 28 (for example, 56 V or 48 V, or similar) into DC power at the two voltage levels required by the corresponding HDD unit 107 (for example, 12 V_DC and 5 V_DC), and outputs this to the power supply lines 113 and 115. Another step-down converter 137 converts the DC power at the single high voltage level from the motherboard 28 (for example, 56 V or 48 V) into DC power at the single voltage level required by the corresponding HDD unit 131 (for example, 24 V), and outputs this to the power supply line 139. And, the other step-down converter 143 converts the DC power at the single high voltage level from the motherboard 28 (for example, 56 V or 48 V) into DC power at the single voltage level required by the corresponding HDD unit 133 (for example, 48 V), and outputs this to the power supply line 145. When the power supply voltage level from the motherboard 28 and the power supply voltage level required by an HDD unit are equal (for example, when both are 48 V), the step-down converter may be eliminated; or, in place of a step-down converter, a circuit to stabilize the voltage level output to the HDD unit (for example, a circuit which employs a large-capacity capacitor to suppress fluctuations in the output voltage level arising from fluctuations in the load current of the HDD unit) may be used.

Figure 5:
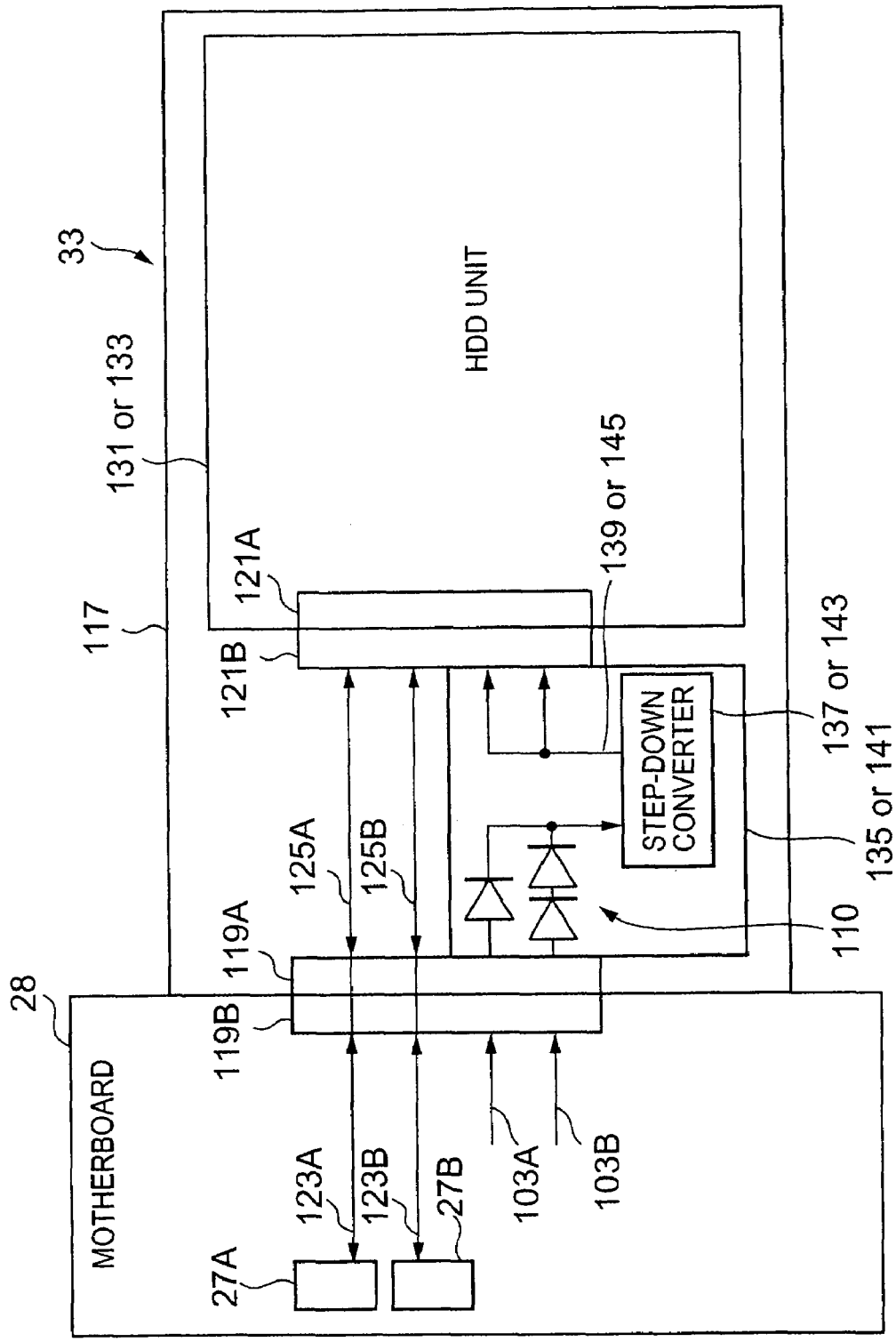
FIG. 5 shows in summary an example of the arrangement of internal components in an HDD pack 33 in which is installed the single-power-supply type HDD unit 131 or 133 shown in FIG. 4.

FIG. 5 shows in summary an example of arrangement of internal components of an HDD pack 33 in which is installed a single-power-supply type HDD unit 131 or 133, shown in FIG. 4.

As shown in FIG. 5, a case is assumed in which a connector 121A having physical specifications similar to those of the multiple-power-supply type HDD units 107 or 108 shown in FIG. 3 is used in the single-power-supply type HDD unit 131 or 133. This connector 121A is assumed to conform for example to FC specifications, and has four power supply terminals. In such a case, in the multiple-power-supply type HDD units 107 or 108 shown in FIG. 3, two of the four power supply terminals are allocated to the 12 V_DC power 113, and the remaining two are allocated to the 5 V_DC power 115; whereas in the single-power-supply type HDD units 131 or 133 shown in FIG. 5, all four of the power supply terminals can be used to supply power 139 or 145 at a single high voltage level (for example, 24 V, 48 V, or similar). By this means, the power which can be supplied to the HDD unit 131 or 133 is increased.

Figure 6:
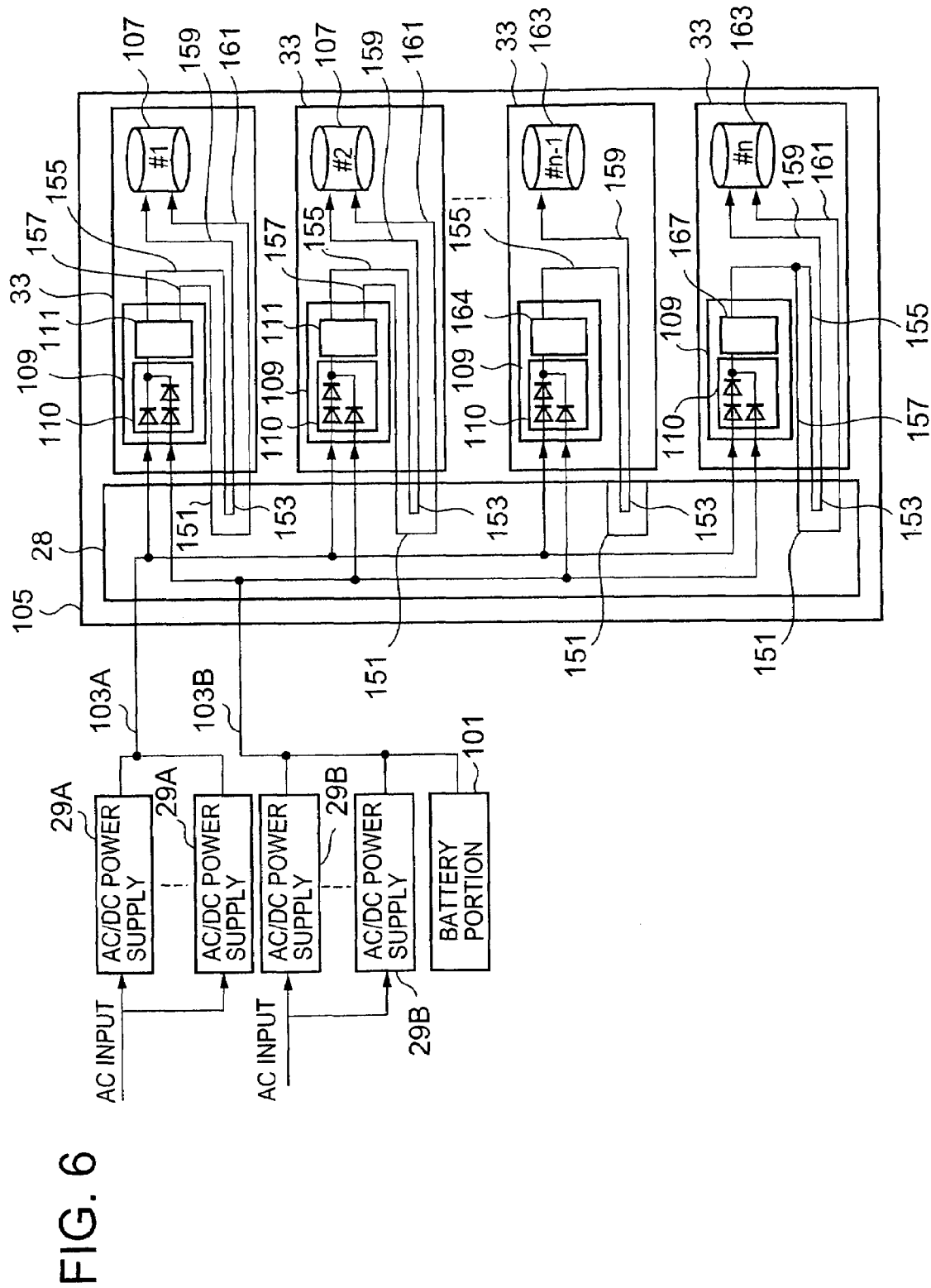
FIG. 6 is a block diagram showing an example of another specific internal configuration of an HDD pack 33, and showing still another specific example of a method of supply of power to an HDD pack 33.
Figure 7:
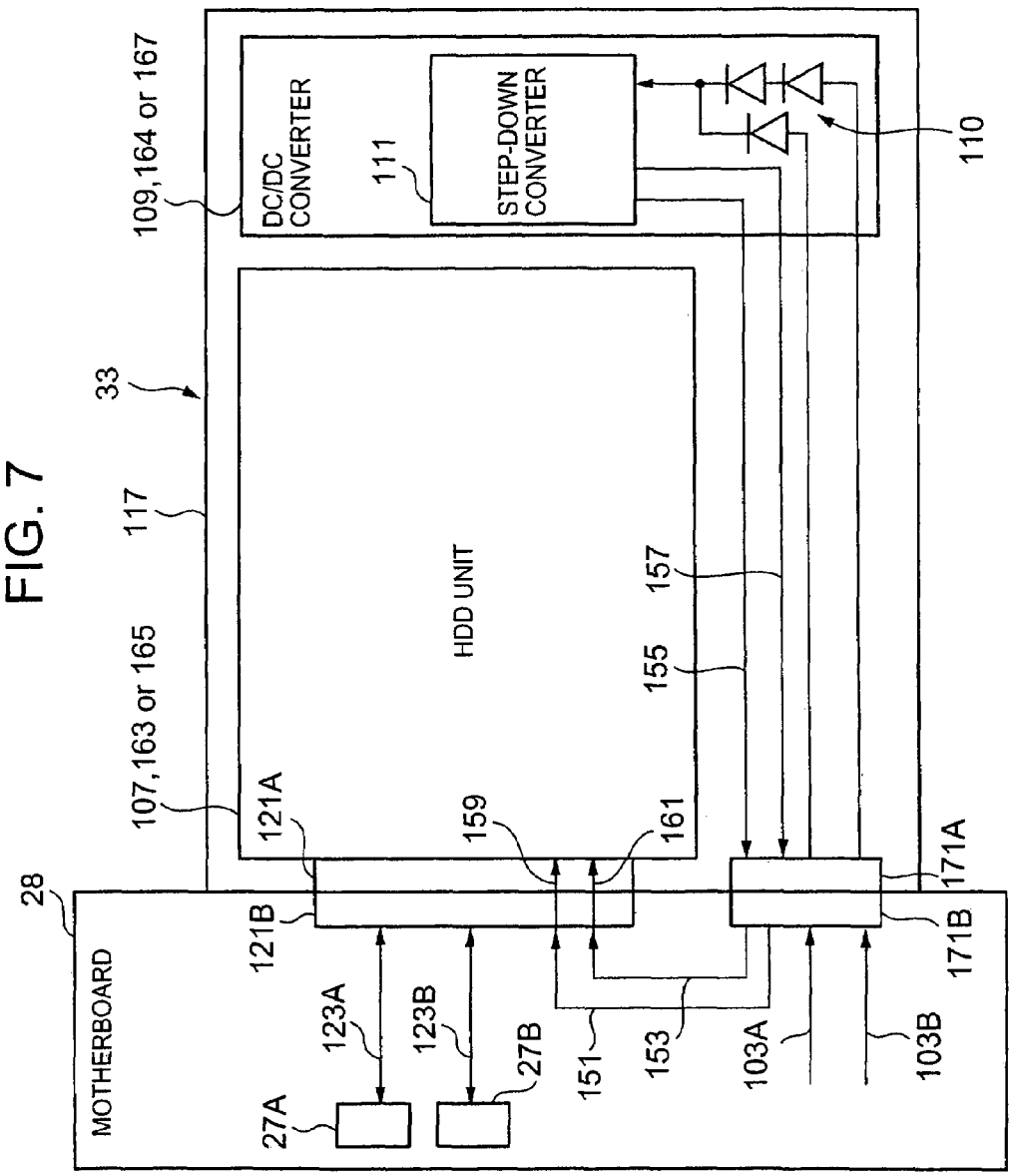
FIG. 7 shows in summary the arrangement of internal components in the HDD pack 33 shown in FIG. 6.
Figure 8:
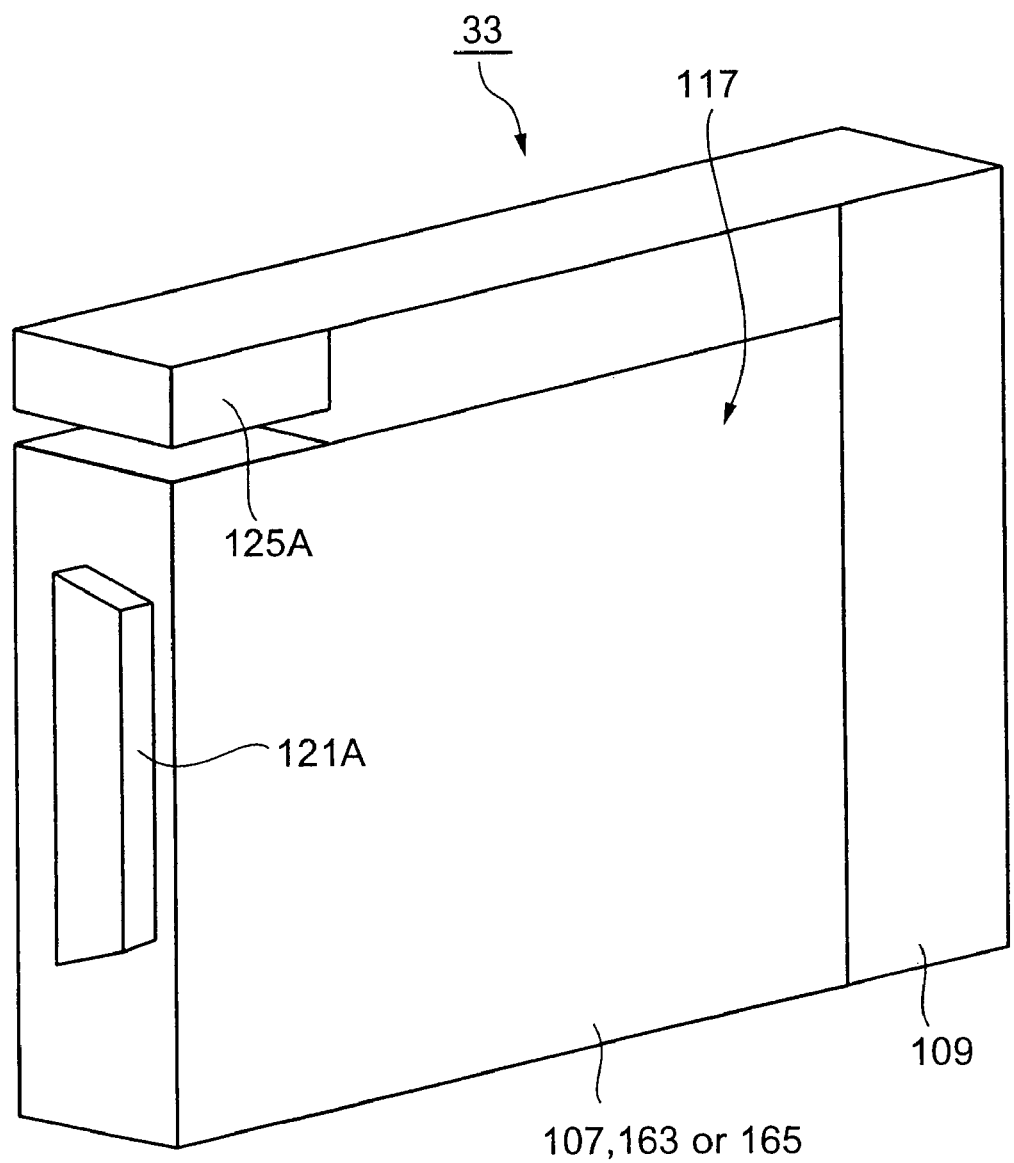
FIG. 8 shows an external view of the HDD pack 33 shown in FIG. 6.

FIG. 6 shows another example of a specific interior configuration of an HDD pack 33, and still another example of a method of supply of power to an HDD pack 33. In FIG. 6, the wiring for data transfer is omitted. FIG. 7 shows in summary the arrangement of internal components of the HDD pack 33 shown in FIG. 6. In FIG. 7, the wiring for data transfer is shown in an extremely simplified manner. FIG. 8 shows an external view of the HDD pack 33 shown in FIG. 6.

In the configuration example of FIG. 6, after the power output from the step-down converter 111, 164 or 167 within each HDD pack 33 is once returned to the motherboard 28, it is supplied to the HDD units 107, 163 or 165 within the HDD packs 33 from the motherboard 28. That is, U-turn power supply lines 151, 153 are provided on the motherboard 28 corresponding to each HDD pack 33. Within each HDD pack 33 there exists return power supply lines 155, 157; these return the power output from a step-down converter 111, 164 or 167 to the U-turn power supply lines 151, 153 of the motherboard 28. The U-turn power supply lines 151, 153 input the returned power to the power supply input lines 159, 161 of the HDD units 107, 163 or 165 within each HDD pack 33.

As shown in FIG. 7 and FIG. 8, the connector 121A of the HDD units 107, 163 or 165 and the power supply connector 171A are provided on the outer face of the canister 117 of the HDD pack 33; these connectors 121A and 171A are connected to the corresponding connectors 119B and 171B on the motherboard. The power output by the DC/DC converter 109, 164 or 167 within the HDD pack 33 passes through the power supply connector 171A, is returned to the U-turn power supply lines 151, 153 on the motherboard 28, and is input from the U-turn power supply lines 151, 153 to the power supply terminals (power supply lines) 159, 161 of the connector 121A of the HDD unit 107, 163 or 165. As shown in the figure, because the connector 121A of the HDD unit 107, 163 or 165 is directly connected to the connector 119B on the motherboard 28, the distance between the two is very short, and there is no circuitry or wiring intervening therebetween. As a result, power can be supplied to the HDD unit 107, 163 or 165 without degradation of the waveform quality of the high-speed data signal.

Referring again to FIG. 6, the two HDD units 107 shown in the top of the figure are multiple-power-supply type units requiring, for example, 12 V_DC power and 5 V_DC power. The HDD unit 163 shown second from the bottom is a single-power-supply type unit requiring a single type of supplied power at a higher voltage level (for example, 24 V_DC) than the power supplied to the above HDD units 107. And the HDD unit 165 shown at the bottom is a single-power-supply type unit requiring a single type of power to be supplied, at for example another voltage level (for example, 48 V_DC). Here, a case is imagined in which the HDD units 107, 163 and 165 all have a connector 121A with the same specifications. This connector 121A is assumed to have four power supply terminals conforming to, for example, FC specifications. In this case, in each of the two HDD packs 33 shown at the top, the step-down converter 111 outputs two types of power, for example at 12 V_DC and 5 V_DC, required by the multiple-power-supply type HDD units 107. These two types of power are input, via the single U-turn power supply lines 151 and 153 on the motherboard 28, to the two power supply terminals for 12 V_DC and the two power supply terminals for 5 V_DC in the connector 121A of the HDD units 107. In the HDD pack 33 shown second from the bottom, the step-down converter 164 outputs a single type of power, for example 24 V_DC, required by the single-power-supply type HDD unit 163. This single type of power is input, via the U-turn power supply line 153 on the motherboard 28, to two of the four power supply terminals in the connector 121A of the HDD unit 163. And, in the HDD pack 33 shown at the bottom, the step-down converter 167 outputs a single type of power, for example 48 V_DC, required by the single-power-supply type HDD unit 165. This single type of power is input, via both the U-turn power supply lines 151 and 153 on the motherboard 28, to all four of the power supply terminals in the connector 121A of the HDD unit 165. By means of a configuration in which one type of power is supplied using all of the plurality of power supply terminals of the connector 121A of the HDD unit 165, as in the case of the lowermost HDD pack 33, higher power can easily be supplied compared with a configuration in which only a portion of the power supply terminals is used for the supply of one type of power, as in the case of the other HDD packs 33.

The types and numbers of the HDD units 107, 163 and 165 shown in FIG. 6 are no more than simple examples for purposes of explanation. According to the configuration example shown in FIG. 6, an arbitrary number of the HDD units 107, 163 and 165 of different types and requiring DC power at different voltage levels can be installed at arbitrary positions on the same motherboard 28. Moreover, as explained above, there is little degradation of the waveform quality of high-speed data signals.

Figure 9:
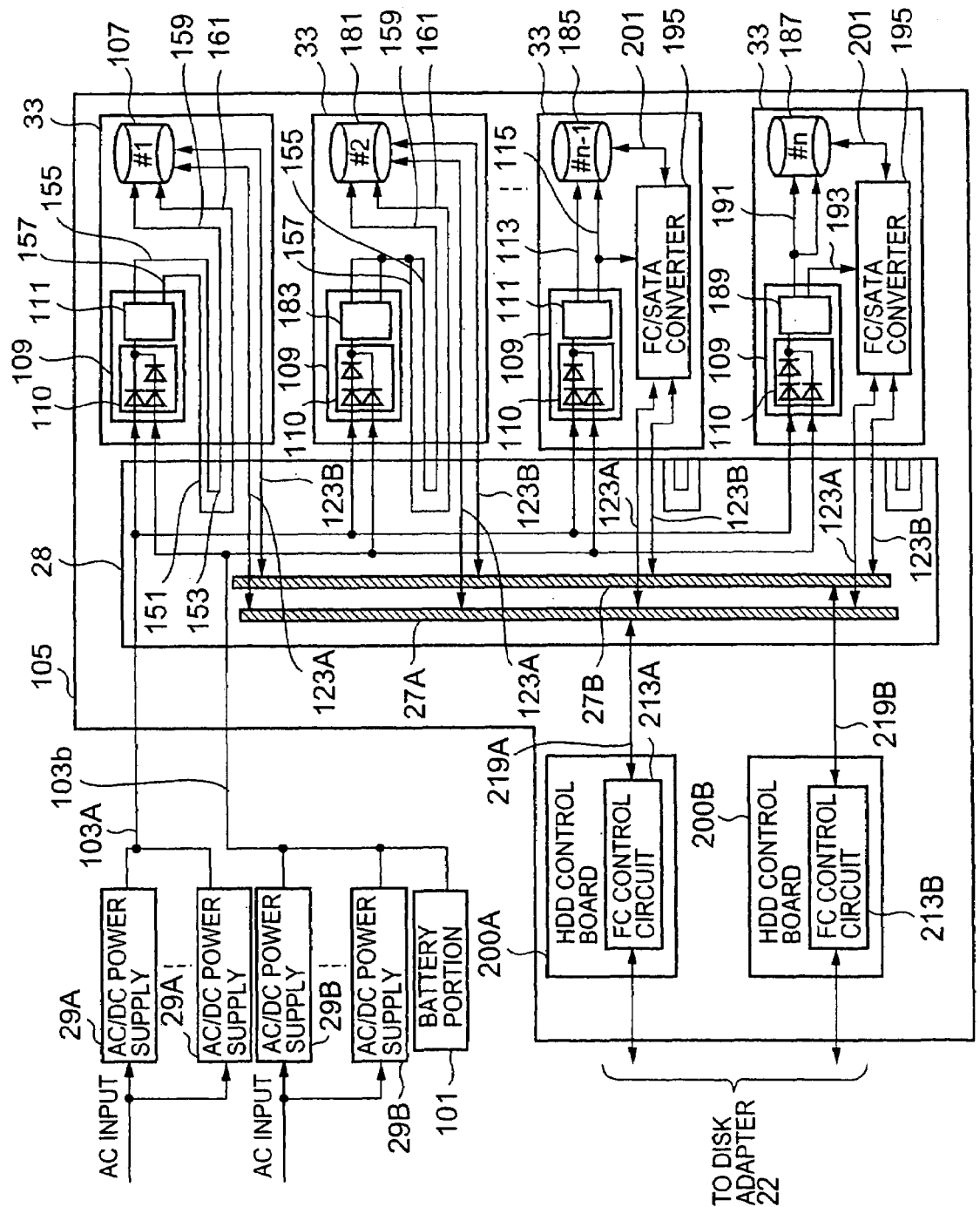
FIG. 9 is a block diagram showing still another specific example of the internal configuration of an HDD pack 33, and still another specific example of a method of supply of power to an HDD pack 33.
Figure 10:
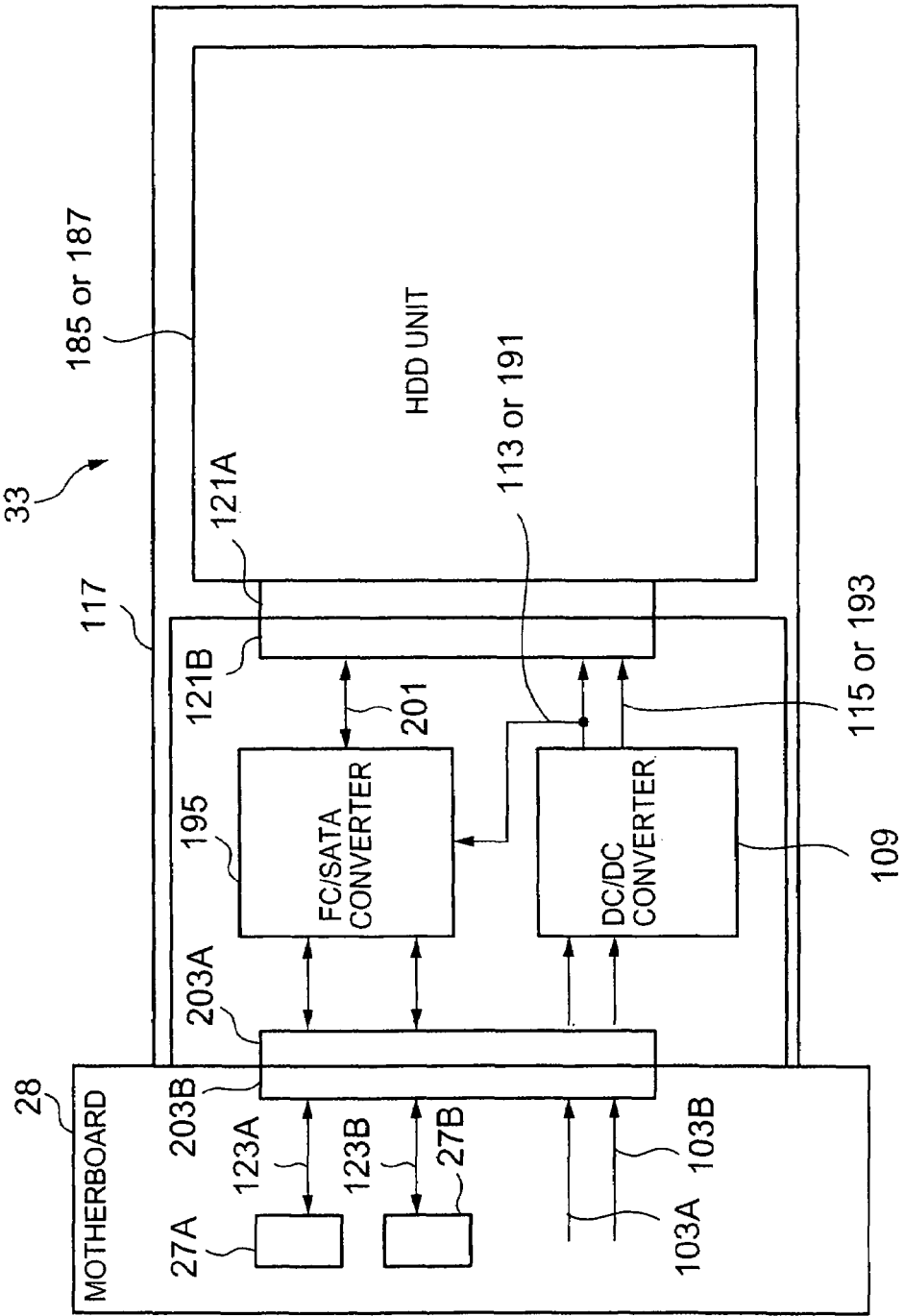
FIG. 10 shows in summary the arrangement of internal components in an HDD pack 33 in which is mounted the SATA-specification HDD unit 185 or 187 shown in FIG. 9.

FIG. 9 shows another example of a specific internal configuration of an HDD pack 33, and still another example of a method of supplying power to an HDD pack 33. In FIG. 9, the wiring for data transfer is shown in an extremely simplified manner. FIG. 10 shows in summary the arrangement of internal components of an HDD pack 33 in which is installed the SATA-specification HDD unit 185 or 187 shown in FIG. 9.

In the configuration example of FIG. 9, the different types of HDD units 107, 181, 185 and 187 having different data transfer interface specifications are installed on the same motherboard 28. For example, the HDD units 107 and 181 shown in the top of the figure conform to the FC (fiber channel) interface specification. The uppermost HDD unit 107 is a multiple-power-supply type unit requiring the supply of power at a plurality of voltage levels, for example 12 V_DC and 5 V_DC, and the second HDD unit 181 is a single-power-supply type unit requiring the supply of power at a single voltage level, for example 24 V_DC. The HDD units 185 and 187 shown in the bottom are SATA (serial-ATA)-specification units. The HDD unit 185 which is second from the bottom is a multiple-power-supply type unit requiring the supply of power at a plurality of voltage levels, for example 12 V_DC and 5 V_DC, and the lowermost HDD unit 187 is a single-power-supply type unit requiring the supply of power at a single voltage level, for example 24 V_DC. The configuration of an HDD pack 33 in which is installed an FC-specification HDD unit 107 or 181 is as previously explained with reference to FIG. 6 through FIG. 8.

As shown in FIG. 9 and FIG. 10, an HDD pack 33 in which is installed a SATA-specification HDD unit 185 or 187 is provided with an FC/SATA converter 195 which performs conversion from the FC-specification data transfer interface on the motherboard side (data transfer paths 123A, 123B) to the SATA-specification data transfer interface on the HDD side (data transfer path 201), as well as the reverse conversion. A DC/DC converter 111 or 189 within an HDD pack 33 not only supplies power to the HDD unit 185 or 187 (the power supply lines 113 and 115 or 191), but also supplies power (for example, 5 V_DC) to the FC/SATA converter 195. In the example shown, the FC/SATA converter 195 converts the FC-specification data transfer paths 123A, 123B for two ports into the SATA-specification data transfer path 201 for one port. As a modification, the FC/SATA converter 195 may also transfer one port's worth of the FC-specification data transfer path 123A or 123B into one port's worth of the SATA-specification data transfer path 201. However, as shown in the figure, an FC/SATA converter 195 which supports the FC-specification data transfer paths 123A, 123B of two ports affords higher safety with respect to interface faults than support for a single port.

In FIG. 9 the reference numbers 200A, 200B refer to twofold-redundant HDD control boards provided on the motherboard 28, and each of which can substitute for the other. The HDD control boards 200A, 200B respectively have FC control circuits 213A, 213B. The FC control circuits 213A, 213B are respectively connected to the twofold-redundant connection control circuits 27A and 27B on the motherboard 28 (for example, fiber channel switching circuits or port bypass circuits, or similar), and, via the data transfer paths 219A, 219B, with the twofold-redundant channel adapters 21 shown in FIG. 1 intervening, to the connection control circuits 27A, 27B. The FC control circuits 213A, 213B control the connection control circuits 27A, 27B, and via the connection control circuits 27A, 27B, exchange data with all of the HDD packs 33 on the motherboard 28.

The types and numbers of the HDD units 107, 181, 185 and 187 shown in FIG. 9 are no more than simple examples for purposes of explanation. According to the configuration example shown in FIG. 9, a plurality of types of HDD unit, with different data transfer interfaces such as FC-specification and SATA-specification interfaces and also with different power supply voltage levels, can be installed on the same motherboard. The principle of this configuration example can be applied not only to cases in which HDD units with different interface specifications are used together, but also to cases in which only HDD units with one interface specification are used. As was explained referring to FIG. 1, normally two or more HDDs 26 belonging to the same parity group are the same with respect to power supply specifications and data transfer interface specifications. On the other hand, it is possible for power supply specifications or for data transfer interface specifications to differ between different parity groups. In this case, in the configuration shown in FIG. 9, the power supply specification or data transfer specification can be made different for each parity group.

Figure 11:
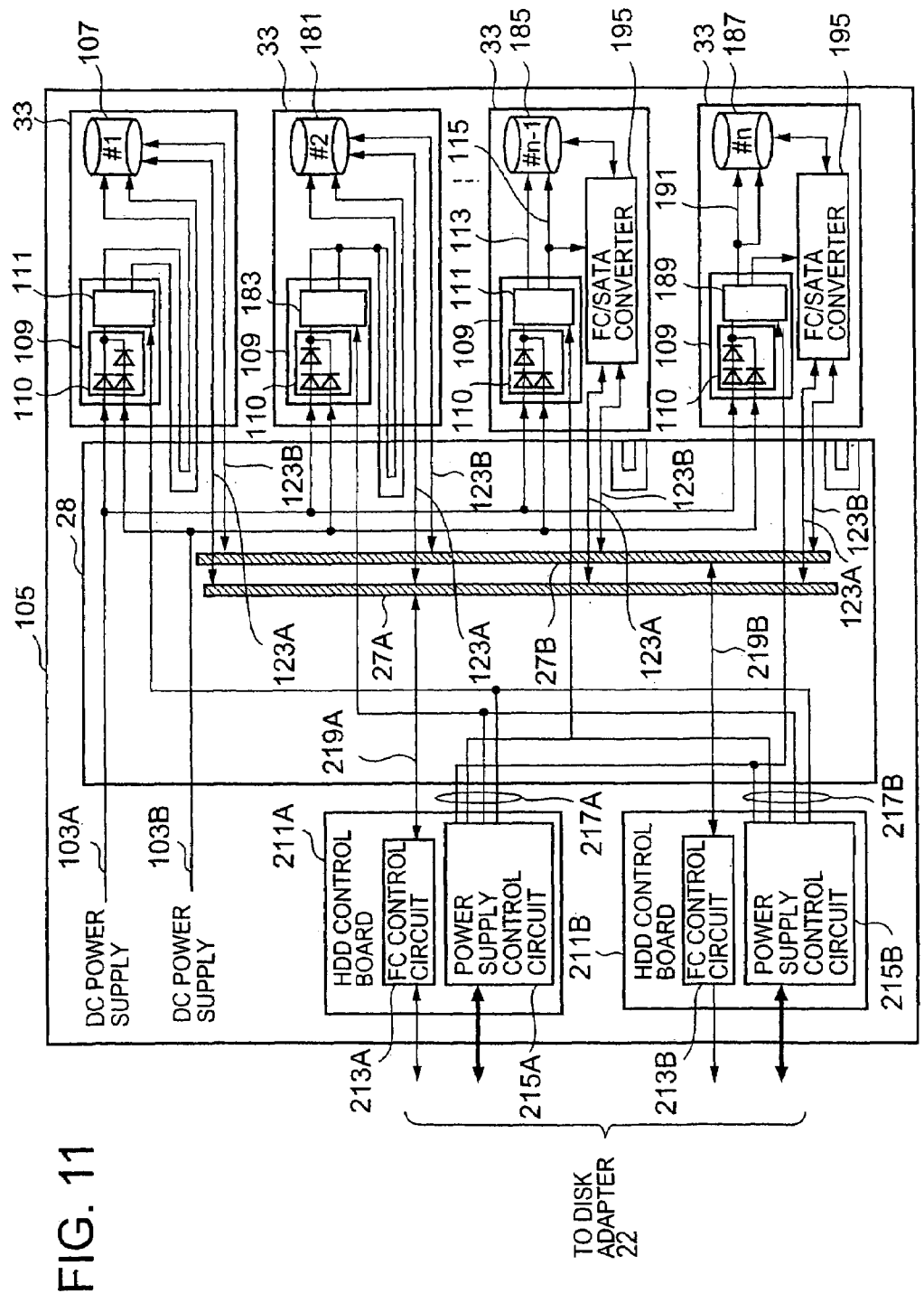
FIG. 11 is a block diagram showing still another specific example of a method of supply of power to an HDD pack 33; and, FIG. 12 is a block diagram showing still another specific example of the internal configuration of an HDD pack 33, and still another specific example of a method of supply of power to an HDD pack 33.

FIG. 11 shows still another example of a method of supplying power to HDD packs 33. In FIG. 11, the AC/DC power supply circuit has been omitted.

In the configuration example of FIG. 11, the twofold-redundant HDD control boards 211A, 211B, each of which can be substituted for the other, are provided on the motherboard 28. The HDD control boards 211A, 211B respectively have FC control circuits 213A, 213B and power supply control circuits 215A, 215B. As already explained referring to FIG. 9, the FC control circuits 213A, 213B control the twofold-redundant connection control circuits 27A, 27B on the motherboard 28, and through these connection control circuits 27A, 27B, exchange data with all the HDD packs 33 on the motherboard 28. The power supply control circuits 215A, 215B monitor the state of the DC power supply wiring on the motherboard 28, and by outputting control signals 217A, 217B individually turn on and off the DC/DC converters 109 (step-down converters 111, 183, 189) within all of the HDD packs 33 on the motherboard 28. The configuration of other portions of the motherboard 28 and of the HDD packs 33 are similar to the configuration example of FIG. 9 explained above.

In the configuration example of FIG. 11, the control functions of the power supply control circuits 215A, 215B can be utilized as follows. For example, when inserting or removing a live wire of an HDD pack 33 (when attaching or removing to or from the motherboard 28 an HDD pack 33 in a state in which the DC power supply lines 103A, 103B are live), the DC/DC converter 109 within the HDD pack 33 can be put into the stopped state in advance by means of the power supply control circuits 215A, 215B. In this way, the danger of rush currents entering an HDD unit 107, 181, 185 or 187 upon insertion or removal of a live wire can be avoided. Also, when for example an HDD pack 33 is currently being used, the supply of power to the HDD pack 33 can be halted. By this means, power consumption can be controlled according to the state of use of the HDD, and wasteful power consumption can be decreased. Also, there are cases in which the total time over which consecutive use is possible is specified to be shorter for the SATA-specification HDD units 185, 187 than for the FC-specification HDD units 107, 181. In such cases, for example during standby, the power supply control circuits 215A, 215B can be used to halt the supply of power to SATA-specification HDD units 185, 187. By this means, the effective time of use of SATA-specification HDD units 185, 187 can be extended, and brought closer to the lifetime of FC-specification HDD units 107, 181. Also, in order to perform pairing or mirroring of logical volumes according to the RAID principle, FC-specification HDD units 107, 181 can be allocated as primary volumes for online access, with SATA-specification HDD units 185, 187 allocated as secondary volumes which are copies of the primary volumes. In this case, for example during online operations, power is supplied to the FC-specification HDD units 107, 181 allocated as primary volumes, but the power supply to the SATA-specification HDD units 185, 187 allocated as secondary volumes can be stopped except when writing copied data, so as to extend the lifetime. Also, SATA-specification HDD units 185, 187 can be allocated to storage devices for backup of FC-specification HDD units 107, 181. In this case, the power supply to the SATA-specification HDD units 185, 187 can be stopped except during backup operation. By this means, inexpensive SATA-specification HDD units 185, 187 employed as storage devices for backup can be used with approximately the same lifetime as FC-specification HDD units 107, 181. Moreover, power consumption can be effectively reduced.

Figure 12:
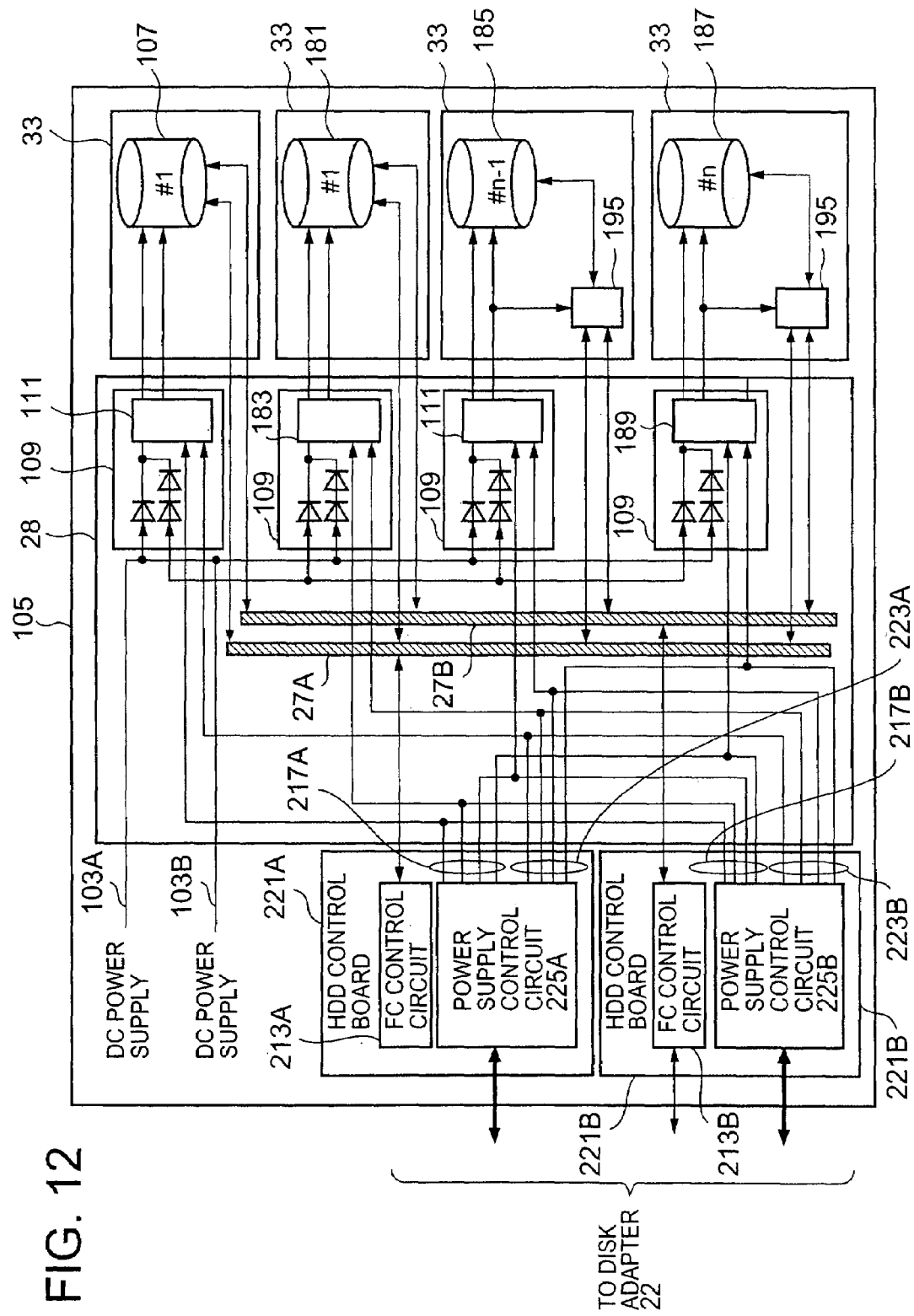

FIG. 12 shows still another example of a specific internal configuration of an HDD pack 33, and still another specific example of a method of supplying power to an HDD pack 33. In FIG. 12, the AC/DC power supply circuit is omitted.

In the configuration example of FIG. 12, the specifications of the HDD units 107, 181, 185 and 187 are similar to those of the configuration examples in FIG. 9 and FIG. 11. In the configuration example of FIG. 12, the DC/DC converters 109 for these HDD units 107, 181, 185 and 187 are mounted on the motherboard 28. Hence the DC/DC converters 109 do not exist within the respective HDD packs 33. Consequently when replacing HDD packs 33, the DC/DC converters 109 are not also replaced, and in this respect greater economy is achieved. Various arrangements of the DC/DC converters 109 on the motherboard 28 can be adopted. As one example of an arrangement, the DC/DC converters 109 are arranged in proximity to the installation positions of the corresponding HDD packs 33. By this means, the transmission path from the DC/DC converter 109 to the HDD pack 33 is made short, so that the effect of power supply noise is minimal.

Also, twofold-redundant HDD control boards 221A, 221B are provided on each motherboard 28. The HDD control boards 221A, 221B have FC control circuits 213A, 213B and power supply control circuits 225A, 225B. The functions of the FC control circuits 213A, 213B have already been explained. In addition to controlling the turning on and off of each of the DC/DC converters 109 as already explained, the power supply control circuits 225A, 225B also have functions to indicate to each DC/DC converter 109 the power supply voltage levels required by each HDD pack 33 by means of voltage control signals 223A, 223B, and to change the output voltage levels of the DC/DC converters 109 according to the HDD packs 33. When the step-down converters in the DC/DC converters 109 are of the type which perform power conversion through switching, such as a chopper circuit, as one method to control the output voltage level of each DC/DC converter 109, for example, the target voltage level indicated by the voltage control signals 223A, 223B can be compared with the output voltage level, and the switching duty ratio increased or reduced such that the difference disappears.

Through the above-described representative aspects of this invention, at least the following advantageous results can be obtained.

(1) HDD units which operate at a single power supply voltage can be installed in a storage system.

(2) A plurality of HDD types, requiring different power supply voltages, can be installed together on the same motherboard.

(3) A plurality of HDD units requiring different power supply types can be installed at arbitrary times at arbitrary positions on a motherboard. Hence the range of HDD units which can be selected for use in future can be expanded.

(4) HDD units requiring a power supply voltage level of 12 V_DC or higher, which is the highest power supply voltage level of HDD units generally adopted for use in the prior art, can be flexibly supported. By using a higher power supply voltage level than in the prior art, the power supply current can be reduced compared with the prior art, and power supply voltage stability is improved.

(5) Inexpensive SATA-specification HDD units can be installed on the same motherboard together with FC-specification HDD units.

(6) When all the HDD units initially installed on a motherboard are FC-specification units, these FC-specification HDD units can be replaced in sequence with SATA-specification HDD units, so that ultimately all units are replaced by SATA-specification HDD units.

(7) By individually controlling the turning on and off of the power supplied to each HDD unit among the plurality of HDD units in the storage system, for example, SATA-specification HDD units can be used as secondary storage devices for backup or mirroring of FC-specification HDD units within the same system. By this means, the reliability of the storage system is improved, and cost reductions are easily achieved.

(8) HDD units with different power supply specifications can be backed up by batteries at a single voltage level.

In the above, aspects of this invention have been explained; but these aspects are no more than examples used to explain the invention, and the scope of the invention is not limited only to these aspects. This invention can be implemented in various other modes without deviating from the gist of the invention.

What is claimed is:

1. A storage system comprising:
a power supply circuit which outputs a single type of power having a single voltage level;
a main body having a main power supply line to transmit said single type of power output from said power supply circuit, a data transfer path for data transfer, and a plurality of pack connection sites; and
a plurality of storage device packs which can receive said single type of power from said main power supply line, which are each connected to said plurality of pack connection sites on said main body so as to enable exchange of data with said data transfer path, and which can be removed from said pack connection sites,
wherein each storage device pack comprises:
a physical storage device requiring the supply of one or more types of power each having a prescribed voltage level, and
a power conversion circuit which receives said single type of power from said main power supply line, converts said single type of power into said one or more types of power required by said physical storage device units, and outputs said converted one or more types of power to said physical storage device,
wherein the voltage level of said single type of power from said main power supply line is equal to or higher than the highest voltage level of said one or more types of power required by said physical storage device,
wherein each of said plurality of pack connection sites on said main body comprises:
a U-turn power supply line to receive, and once again input to said storage device pack, said one or more types of power output from said power conversion circuit within said storage device pack, wherein said plurality of storage device packs comprises at least one power-returning type storage device pack, wherein said power-returning type storage device pack further has a return power supply line to return said one or more types of power output from said power conversion circuit to said U-turn power supply line, and an input power supply line to input, to said physical storage device, said one or more types of power which are again input from said U-turn power supply line, and wherein said power-returning type storage device pack can be connected to any of said plurality of pack connection sites on said main body.

2. The storage system according to claim 1, wherein at least one of said physical storage devices is a Fiber Channel (FC) storage device having a FC interface, and at least another one of said physical storage devices is a Serial Advanced Technology Attachment (SATA) storage device having a serial interface, wherein said storage device pack having a SATA storage device also includes a FC/SATA converter, and wherein the power conversion circuit, being included in said storage device pack having said SATA storage device, is coupled to said SATA storage device and the FC/SATA converter for supplying power to said SATA storage device and the FC/SATA converter.

3. The storage system according to claim 2, wherein said first power conversion circuit supplies power to said physical storage device via a single power supply line.

4. The storage system according to claim 2, wherein said power supply circuit is a AC/DC power supply, said power conversion circuit is a DC/DC converter, and said first types of power is higher than said single types of power.

5. The storage system according to claim 2, wherein said physical storage devices incorporate internal voltage conversion circuits which convert power supplied by said power conversion circuit and having a single voltage value into a plurality of voltage values.

6. The storage system according to claim 5, wherein power having one of the plurality of voltage values converted by said internal voltage conversion circuits is used to drive magnetic storage media of said physical storage devices, and power having another of said plurality of voltage values is used to drive interface logic circuits of said physical storage devices.

7. The storage system according to claim 2, wherein said power conversion circuit receives power having said first voltage value, and outputs power having said single voltage value.

8. The storage system according to claim 2, wherein any of said plurality of storage device packs is a first storage device pack having a first power conversion circuit which receives power having a first voltage value from said power supply circuit, converts said first voltage value into a second voltage value different from said first voltage value, and supplies power having a single voltage value to said physical storage device, and wherein any of the other of said plurality of storage device packs is a second storage device pack having a second power conversion circuit which receives power having the first voltage value from said power supply circuit, converts said first voltage value into a second voltage value different from said first voltage value, and supplies power having a plurality of different voltage values to said physical storage device.

9. The storage system according to claim 2, wherein a motherboard is positioned between said power supply circuit and said storage device pack, and said first power conversion circuit is connected, via said motherboard, to a power supply line connecting said physical storage devices.

10. The storage system according to claim 1, wherein the voltage level of said single type of power from said main power supply line is equal to or higher than the highest voltage level of said one or more types of power required by said physical storage device, wherein at least one of said physical storage devices included in said storage device packs is a Fiber Channel (FC) storage device having a FC interface, and at least another one of said physical storage devices is a Serial Advanced Technology Attachment (SATA) storage device having a serial interface, wherein said storage device pack having a SATA storage device also includes a FC/SATA converter, and wherein the power conversion circuit, being included in said storage device pack having said SATA storage device, is coupled to said SATA storage device and the FC/SATA converter for supplying power to said SATA storage device and the FC/SATA converter.

11. The storage system according to claim 10, further comprising:

a power supply control circuit which individually controls the turning-on and turning-off of said power conversion circuits included in said plurality of storage device packs.

12. The storage system according to claim 10, further comprising:

a power supply control circuit which individually controls the output voltage levels of said power conversion circuits included in said plurality of storage device packs, according to the power supply voltage levels required by each of said physical storage devices within said plurality of storage device packs.

13. The storage system according to claim 1, wherein said power-returning type storage device pack comprises:

a canister which accommodates said physical storage device and said power conversion circuit;

a main connector provided in the outer face of said canister and having a power supply terminal functioning as said input power supply line and a data transfer terminal for connection of said data transfer path to said physical storage device; and an auxiliary connector provided in the outer face of said canister and having a main power supply terminal to connect said main power supply line to said power conversion circuit, and a return power supply terminal to connect said return power supply line to said U-turn power supply line, and wherein said physical storage device is positioned within said canister in proximity to said main connector, and is directly connected to said main connector.

* * * * *